US012304922B1

(12) United States Patent
Nikiforov et al.

(10) Patent No.: US 12,304,922 B1
(45) Date of Patent: *May 20, 2025

(54) LOW PRESSURE PROCESS FOR SYNTHESIS OF PT(PF$_3$)$_4$ INVOLVING A SOLUBLE INTERMEDIATE AND STORAGE OF OBTAINED PT(PF$_3$)$_4$

(71) Applicant: L'Air Liquide, Société Anonyme pour l'Etude et l'Exploitation des Procédés Georges Claude, Paris (FR)

(72) Inventors: Grigory Nikiforov, Branchburg, NJ (US); Nicolas Blasco, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 33 days.

This patent is subject to a terminal disclaimer.

(21) Appl. No.: 18/143,500

(22) Filed: May 4, 2023

Related U.S. Application Data

(63) Continuation of application No. 17/546,169, filed on Dec. 9, 2021, now Pat. No. 11,673,904.

(51) Int. Cl.
  *C07F 15/00* (2006.01)
(52) U.S. Cl.
  CPC .................. *C07F 15/0093* (2013.01)
(58) Field of Classification Search
  CPC .................................................. C07F 15/0093
  See application file for complete search history.

(56) References Cited

U.S. PATENT DOCUMENTS

| | | | |
|---|---|---|---|
| 7,044,995 B2 | 5/2006 | Khozan et al. | |
| 11,673,904 B1 * | 6/2023 | Nikiforov | C07F 15/0093 556/136 |
| 2014/0024848 A1 | 1/2014 | Luke et al. | |

FOREIGN PATENT DOCUMENTS

| | | |
|---|---|---|
| JP | 2006 306682 | 11/2006 |
| JP | 2008 231473 | 10/2008 |
| RU | 2 201 463 C1 | 3/2003 |
| RU | 2478576 C2 * | 4/2013 |
| TW | 201741326 | 12/2017 |

OTHER PUBLICATIONS

T. Kruck et al., 4 Angew. Chem. Internat. Edit., 521 (1965) (Year: 1965).*
T. Kruck et al., 364 Zeitschrift fuer Anorganische und Allgemeine Chemie (with English translation), 192-208 (1969) (Year: 1969).*
J. Chatt et al., Journal of the Chemical Society, 3061-3067 (1951) (Year: 1951).*
N. G. Anderson, Practical Process & Research Development, 81-111 (2000) (Year: 2000).*
Altus, K.M. et al., Intermolecular oxidative addition of aryl halides to platinum(II) alkyl complexes, Organometallics (2019), 38(10), 2273-2277.
Arbuzov, B.A. et al., Reactions in the ternary phosphorus trichloride-diene-acetone system, Zhurnal Obshchei Khimii (1975), 45(3), 512-518, ISSN: 0044-460X.
Chatt, J. et al., The nature of the co-ordinate link. Part IV. Complex formation by phosphorus trifluoride, J. Chem. Soc. [London] 1951, 3061-3067.
Cho, H.-G. et al., Infrared spectra of platinum insertion and methylidene complexes prepared in oxidative C—H(X) reactions of laser-ablated Pt atoms with methane, ethane, and halomethanes, Organometallics 2009, 28, 1358-1368.
Crespo, M. et al., Cationic intermediates in oxidative addition reactions of alkyl halides to d$^8$ complexes: evidence for the S$_N$2 mechanism, Organometallics (1987), 6(12), 2548-2550.
Crocker, C. et al., Determination of the magnitudes and signs of coupling constants in complexes containing two or three fluorophosphine ligands by single- and double-resonance N.m.r. spectroscopy, J. Chem. Res., Syn., 1981, 2, 38-39.
Crocker, C. et al., Vibrational spectra of some complexes of platinum and rhodium with trifluorophosphine and some related fluorophosphines, Journal of Chemical Research, Synopses (1981), (2), 37.
Drews, T. et al., Systematic reactions of [Pt(PF$_3$)$_4$], Chem. Eur. J. 2008, 14, 4280-4286.
Falvello, L.R. et al., Evidence of C—H activation of acetone by a platinum(II) complex. Synthesis and structural characterization of [Pt(CH$_2$COCH$_3$)Cl(bipy)] (bipy=2,2'-bipyridyl) Inorganica Chimica Acta (1997), 264(1-2), 297-303.
Finger, G.C. et al., Some anomalous properties of organic fluorine compounds, Transactions of the Illinois State Academy of Science (1936), 29 (No. 2), 89-91.
Harman, J.S. et al., Reactions between phosphorus trifluoride and primary amines, J. Chem. Soc. A (1970), (11), 1935-1938.
Holmes, R.R. et al., The systems phosphorus trifluoride-trimethylamine, phosphorus trifluoride-triethylamine, and methyldichlorophosphine-trimethylamine, Inorganic Chemistry (1963), 2, 384-388.
Jackson, G.S. et al., Gas-phase dehydrogenation of saturated and aromatic cyclic hydrocarbons by Pt$_n$ + (n=1-4), J. Am. Chem. Soc. 1997, 119, 7567-7572.
Konze, W.V. et al., C—H activation and C—C coupling of arenes by cationic Pt(II) complexes, Journal of the American Chemical Society (2002), 124(42), 12550-12556.
Kovtun, S.N. et al., Chemical vapour metal refining (CVMR) of platinum group of metals (PGM), (Publications of the Australasian Institute of Mining and Metallurgy (2002), Feb. 2002, 367-372.
Kruck, T. et al., Direktsynthesen von Trifluorphosphinkomplexen des Kobalts sowie des Nickels und seiner Homologen, Chem. Ber. (1968) 101, 138-142.

(Continued)

*Primary Examiner* — Alexander R Pagano
(74) *Attorney, Agent, or Firm* — Yan Jiang

(57) ABSTRACT

A method for synthesis of Pt(PF$_3$)$_4$ (CAS #19529-53-4), the method comprising the steps of forming a suspension of a platinum precursor Pt(Hal)$_2$, wherein Hal=F, Cl, Br or I, and a metal powder in a solvent, introducing excess amount of PF$_3$ into the suspension of Pt(Hal)$_2$ and the metal powder, forming a soluble reaction intermediate Pt(Hal)$_2$(PF$_3$)$_x$ in the solvent through a reaction between PF$_3$ and Pt(Hal)$_2$, wherein Hal=F, Cl, Br or I, x=1, 2, under a reaction condition, and forming Pt(PF$_3$)$_4$ from a reaction between Pt(Hal)$_2$(PF$_3$)$_x$, the metal powder and the excess of PF$_3$ in the solvent.

30 Claims, 5 Drawing Sheets

(56) References Cited

OTHER PUBLICATIONS

Kruck, T. et al., Synthesis of tetrakis(trifluorophosphine)-platinum(0) and tetrakis (trifluorophosphine)-palladium(0), Angew. Chem. Int. Ed. 1965, 4, 521.
Kruck, T. et al., Uber Trifluorphosphinkomplexe von Palladium(0) und Platin(0), Zeitschrift fur Anorganische und Allgemeine Chemie, Band 364, 1969, 192-208.
Moissan, H., Action du pentafluorure de phosphore sur la mousse de platine au rouge, Bull. Soc. Chim. France 5, 454 (1891).
Nixon, J.F. et al., Novel syntheses of phosphine complexes of zerovalent nickel and platinum, Inorg. Nucl. Chem. Letters, vol. 4, 1968, 275-278.
Pudovik, A.N. et al., Reactions of acid halides of phosphorus acids with unsaturated compounds, Uspekhi Khimii (1968), 37(5), 745-777, ISSN: 0042-1308.
Ruchkin, E.D. et al., Reaction of platinum chloride with iodine in chloroform, Zhurnal Neorganicheskoi Khimil (1970), 15(9), 2445-2448, ISSN: 0044-457X.
Sanner, R.D. et al., Vapor pressure measurements of volatile transition-metal complexes, Report UCRL-53937, Lawrence Livermore National Laboratory, Univ. of California, Livermore, CA, Sep. 19, 1989, 12 pages.
Tao, T. et al., Focused ion beam induced deposition of platinum, Journal of Vacuum Science & Technology, B: Microelectronics and Nanometer Structures (1990), 8(6), 1826-1829.
Terekhov, D.S. et al., Recycling metals using MOCVD process, International Symposium on Recycling of Metals and Engineered Materials, Proceedings, 4th, Oct. 22-25, 2000, 487-491.

\* cited by examiner

LOW PRESSURE PROCESS FOR SYNTHESIS OF PT(PF$_3$)$_4$ INVOLVING A SOLUBLE INTERMEDIATE AND STORAGE OF OBTAINED PT(PF$_3$)$_4$

CROSS REFERENCE TO RELATED APPLICATIONS

The present application is a continuation application of U.S. application Ser. No. 17/546,169 filed Dec. 9, 2021, which is being incorporated by reference herein in its entirety for all purposes.

TECHNICAL FIELD

The present invention relates to synthesis and storage of Pt(PF$_3$)$_4$ used as a precursor in film forming compositions. Pt(PF$_3$)$_4$ is synthesized from a platinum compound selected from Pt(Hal)$_2$ (Hal=F, Cl, Br or I) or Pt(Hal)$_2$(PF$_3$)$_x$ (Hal=F, Cl, Br or I; x=1, 2), a metal powder and PF$_3$ at low pressure in an anhydrous solvent capable of dissolving Pt(Hal)$_2$(PF$_3$)$_x$, a reaction intermediate, wherein Pt(Hal)$_2$(PF$_3$)$_x$ may be formed from Pt(Hal)$_2$ and PF$_3$. The obtained Pt(PF$_3$)$_4$ is then stored under air and moisture free conditions at room temperature in apparatus and ampoules fabricated from metal such as stainless steel and preferably having a passivated or electro-polished inner surface.

BACKGROUND

Chemical vapor deposition (CVD) and atomic layer deposition (ALD) methods are gaining significant attentions for fabrication of catalysts and batteries at industrial scales. A proper precursor for a high throughout-put industrial process should have a high vapor pressure at ideally room temperature, to ensure a maximum dosage in the shortest time and at temperatures that do not compromise the precursor stability. Platinum is widely employed as catalyst and a wide variety of materials containing platinum on support are available to the date. Nonetheless, the processes applying deposition of platinum from the vapor phase are rare due to lack of proper platinum precursors.

For instance, platinum hexafluoride (PtF$_6$, CAS #13693-05-5), a solid at room temperature, although being volatile at room temperature, is rarely applied as deposition precursor due to very strong oxidizing nature and correspondingly very strong etching properties. A widely cited for deposition processes (MeCp)PtMe$_3$ (CAS #94442-22-5) has 1 Torr vapor pressure at 69° C., but start gradually decomposing at 50° C. (Journal of Vacuum Science & Technology, B: Microelectronics and Nanometer Structures (1990), 8(6), 1826-9), precluding utilization of the given compound for the high throughout-put process.

Complex Pt(PF$_3$)$_4$(CAS #19529-53-4) is a volatile liquid at room temperature with the vapor pressure 36 Torr at room temperature (R. D. Sanner et al., Report (1989), (UCRL-53937; Order No. DE90000902)), almost ideal potential precursor for Pt deposition from the vapor phase. However, the compound has a very limited commercial availability. The reason for non-scalability may be technical difficulties associated with the synthesis of Pt(PF$_3$)$_4$, almost ideal potential precursor for Pt deposition from the vapor phase. However, the compound has a very limited commercial availability (only from one supplier in Japan [Japan Advanced Chemicals, in gram scale) and so far no suitable ALD process has been reported using this chemical. The reason for non-scalability may be technical difficulties associated with the synthesis of Pt(PF$_3$)$_4$ at gram scale level and even more difficult in manners that could be scaled up industrially with acceptable yield and realistic operating conditions.

The original synthesis of Pt(PF$_3$)$_4$ in gram scale and yield 70-80% was performed by reaction (1) at 100-150 atm. PF$_3$ and 100° C. applying "fine and oxide free copper powder" (Angew. Chem. Int. Ed. 1965, 4, 521). The synthesis recipe is only one sentence in reference and later references applying the same method, without any details on reaction and equipment. This reaction requires applying PF$_3$ gas onto a mixture of two solids (PtCl$_2$ and Cu powder) at high pressure and is barely scalable for the skilled-in-the-art chemists.

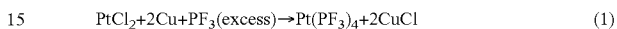

PtCl$_2$+2Cu+PF$_3$(excess)→Pt(PF$_3$)$_4$+2CuCl     (1)

Notable that the reaction of PtCl$_2$ and PF$_3$ (2) at 60-80° C. and under the undisclosed pressure afforded Pt(PF$_3$)$_4$ only in 1% yield (Inorg. Nucl. Chem. Letters, Vol. 4, pp. 275-278, 1968). Such low yield makes this approach impossible to implement for industrial applications.

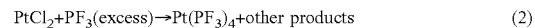

PtCl$_2$+PF$_3$(excess)→Pt(PF$_3$)$_4$+other products     (2)

The flow reaction (3) from the same starting compounds under the undisclosed pressure produced only donor—acceptor adducts (Inorg. Nucl. Chem. Letters, Vol. 4, pp. 275-278, 1968).

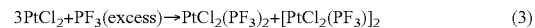

3PtCl$_2$+PF$_3$(excess)→PtCl$_2$(PF$_3$)$_2$+[PtCl$_2$(PF$_3$)]$_2$     (3)

Compounds PtCl$_2$(PF$_3$)$_2$ and [PtCl$_2$(PF$_3$)]$_2$ were synthesized from solid PtCl$_2$ and PF$_3$ gas (J. Chatt, A. A. Williams, J. Chem. Soc. [London]1951, 3061). Solid compounds may react with PF$_3$ under the undisclosed "higher" pressure forming Pt(PF$_3$)$_4$, according to one sentence on page 200 of Zeitschrift fur Anorganische und Allgemeine Chemie, Band 364, 1969, p192-208. One may assume that the "higher pressure" is 40-150 atm since this range is reported in Zeitschrift fur Anorganische und Allgemeine Chemie, Band 364, 1969, p192-208 for synthesis of Pt(PF$_3$)$_4$. Compound PtCl$_2$(PF$_3$)$_2$ is soluble in a polar solvent CDCl$_3$ and its NMR was reported by J. Chem. Res., Syn., 1981, 2, 38. Solubility of PtCl$_2$(PF$_3$)$_2$ in benzene was reported to be "low" and the molar concentrations were 0.005-0.01 M and melting point of PtCl$_2$(PF$_3$)$_2$ is 118.3° C. by J. Chem. Soc. [London]1951, 3061. FTIR spectra of PtCl$_2$(PF$_3$)$_2$ is disclosed in Journal of Chemical Research, Synopses (1981), (2), 37.

Alternatively, preparation of Pt(PF$_3$)$_4$ achieved in a rarely available rotating autoclave in gram scale by reaction (4) under 40 atm of PF$_3$ with the 95% yield (Zeitschrift fur Anorganische und Allgemeine Chemie. Band 364. 1969, 192-208).

PtCl$_4$+4Cu+4PF$_3$→Pt(PF$_3$)$_4$+4CuCl     (4)

PtCl$_4$+6PF$_3$→Pt(PF$_3$)$_4$+2PF$_3$Cl$_2$     (5)

It is notable that the reaction without copper (5) produces PF$_3$Cl$_2$, which complicates purification of Pt(PF$_3$)$_4$ due to comparable volatility (Zeitschrift fur Anorganische und Allgemeine Chemie. Band 364. 1969, 192-208). Although addition of copper reduces amount of PF$_3$Cl$_2$, this implies that reactions (4) and (5) may afford impure Pt(PF$_3$)$_4$, which does not meet the quality standards for CVD and ALD precursors. Noteworthy, reaction (4) also requires mixing two solids and contacting them with PF$_3$ gas, raising already mentioned scalability concerns. The reaction of PtCl$_4$ with excess PF$_3$ makes the scale-up even less realistic.

RU 2478576C2 discloses a two-step process under 2-6.3 MPa (19.7-62.2 atm) of $PF_3$ (6a and 6b), where CuO is reduced in the same autoclave prior to introduction of $K_2PtCl_6$ and $PF_3$.

$$CuO + H_2 \rightarrow Cu + H_2O \quad (6a)$$

$$K_2PtCl_6 + 4Cu + PF_3(\text{excess}) \rightarrow Pt(PF_3)_4 + 4CuCl + 2KCl \quad (6b)$$

RU 2201463C1, U.S. Pat. No. 7,044,995B2, Terekhov et al. (Terekhov et al., International Symposium on Recycling of Metals and Engineered Materials, Proceedings, 4th, Oct. 22-25, 2000, pp. 487-491) and Kovtun et al. (Publications of the Australasian Institute of Mining and Metallurgy (2002), 2/2002, 367-372) disclose a platinum extraction from ore by interaction of "PGM matte" or "raw material" with $PF_3$ gas forming a volatile $Pt(PF_3)_4$. The raw materials were assumed to contain Pt metal and interact with $PF_3$ by (7d). However, Pt and $PF_3$ afforded platinum compound $F_5PPt$ as first reported in 1891 (H. Moissan, Bull. Soc. Chim. France 5, 454 (1891)) and this compound was considered to be analogous to $(PCl_3)PtCl_2$.

$$3Pt + 4HNO_3 + 18HCl \rightarrow 3H_2PtCl_6 + 4NO + 8H_2O \quad (7a)$$

$$H_2PtCl_6 + 2NH_3 \rightarrow (NH_4)_2PtCl_6 \quad (7b)$$

$$(NH_4)_2PtCl_6 + H_2 = 2NH_4Cl + 4HCl + Pt(\text{under ultrasonic irradiation}) \quad (7c)$$

$$Pt + PF_3(\text{excess}) \rightarrow Pt(PF_3)_4 \quad (7d)$$

In addition, according to Chem. Ber. 101, 138-142 (1968), Pt metal does not react with $PF_3$ at any conditions. U.S. Pat. No. 7,044,995 B2 discloses that finely dispersed Pt metal (platinum black, particles sizes <20 μm) does not react with $PF_3$ and only "activated" Pt metal obtained by the multi-step procedure (7a-7c) and applying the reduction with hydrogen under the ultrasonic irradiation in step (7c) could react with $PF_3$.

Solvent effect may be negative for reaction starting from $PtCl_2$, because according to Zhurnal Neorganicheskoi Khimii (1970), 15(9), 2445-8, in contrast to the neat reaction of $PtCl_2 + I_2 = PtCl_2I_2$, reaction of these reagents in organic solvents gave various products but not $PtCl_2I_2$. Several classes of solvents react with $PF_3$, $PtCl_2$, and reduced Pt species, and hence may not be used for synthesis of $Pt(PF_3)_4$. These classes of the solvents include primary amines, since they react with $PF_3$ producing $RNHPF_2$, $(RNH)_2PF_2H$, and $(RNH)_2PF$ (See J. Chem. Soc. A (1970), (11), 1935-8). Tertiary amines, e.g. $NMe_3$, $NEt_3$ are forming adducts with $PF_3$ (See Inorganic Chemistry (1963), 2, 384-8). Alcohols and $PF_3$ form organic phosphites (See Transactions of the Illinois State Academy of Science (1936), 29 (No. 2), 89-91). General patterns of reactivity of $P(Hal)_3$ (Hal=Cl, Br) toward alcohols are well documented. Dienes, olefins, unsaturated aldehydes, ketones reacts with $PF_3$ forming addition compounds as was shown for $PCl_3$ and $PBr_3$ in (See Uspekhi Khimii (1968), 37(5), 745-77). Acetone reacts with $PF_3$ and Pt(II) compounds (See Zhurnal Obshchei Khimii (1975), 45(3), 512-18; Inorganica Chimica Acta (1997), 264(1-2), 297-303). Halocarbons may react with Pt compounds under reaction conditions via oxidative addition as was shown in selected examples in Organometallics (2019), 38(10), 2273; Organometallics 2009, 28, 1358-1368; and Organometallics (1987), 6(12), 2548]; oxidative addition of alkyl and aryl halides to platinum complexes is well documented reaction.

In conclusion, the existing synthesis approaches for $Pt(PF_3)_4$ strongly depend on the reaction conditions, while changing in conditions may significantly reduce the yield of $Pt(PF_3)_4$ or afford different products indicating a lack of robustness of the process, and no synthesis process has been reported so far requiring a $PF_3$ pressure inferior to 3 MPa (29.6 atm, 420 psig) as claimed in RU 2478576C2. Most of syntheses require special equipment or conditions not commonly available for scaling of processes to large scale, such as high pressure autoclaves. In particular, the existing methods are lacking of technical details and a purity of $Pt(PF_3)_4$ has not been reported in any references. Further, all the disclosed methods are essentially dry approaches which also present significant challenges for scale-up to industrial scale.

Numeral references for catalytic transformation of hydrocarbons by platinum compounds exist, such as, Journal of the American Chemical Society (2002), 124(42), 12550-12556. A catalytic activity of Pt compounds was illustrated for model systems $Pt_4(PF_3)_8$— saturated and aromatic cyclic hydrocarbons in Jackson et al., J. Am. Chem. Soc. 1997, 119, 7567-7572. Namely small platinum clusters generated from $Pt_4(PF_3)_8$ react with a variety of saturated and aromatic cyclic hydrocarbons (cyclohexane, benzene, toluene). Jackson et al. illuminate a catalytic and dehydrogenation behavior of platinum. Hence one may assume that introduction of a hydrocarbon solvent in the reaction system followed by heating could lead to a mixture of products due to various catalytic reactions and may be considered as not favorable idea for selective synthesis of $Pt(PF_3)_4$. Owing to these reasons, $Pt(PF_3)_4$ was never synthesized and operated in organic solvents and only anhydrous HF and $SO_2$ were applied as solvents to study $Pt(PF_3)_4$ chemistry (Drews et al., Chem. Eur. J. 2008, 14, 4280-4286).

It would be a significant advancement to provide a method capable of a scale up production of $Pt(PF_3)_4$ in a high yield, since up to date a potentially ideal $Pt(PF_3)_4$ precursor has not applied only due to absence of scalable method.

SUMMARY

Disclosed is a method for synthesizing $Pt(PF_3)_4$(CAS #19529-53-4), the method comprising the steps of:

dissolving a platinum compound having a general formula, $Pt(Hal)_2(PF_3)_x$, in an anhydrous solvent forming a $Pt(Hal)_2(PF_3)_x$ solution, wherein Hal=F, Cl, Br or I, x=1, 2;

adding a metal powder and excess amount of $PF_3$ into the $Pt(Hal)_2(PF_3)_x$ solution; and forming $Pt(PF_3)_4$ through a reaction between $Pt(Hal)_2(PF_3)_x$, $PF_3$ and the metal powder under a reaction condition. The disclosed methods may include one or more of the following aspects:

the reaction condition including a reaction temperature ranging from approximately −120-200° C.;

the reaction condition including a reaction temperature ranging from approximately 30-200° C.;

the reaction condition including a reaction temperature ranging from room temperature to approximately 180° C.;

the reaction condition including a reaction temperature ranging from room temperature to approximately 130° C.;

the reaction condition including a reaction temperature ranging from approximately 80-130° C.;

the reaction condition including a reaction pressure ranging from approximately 10 psig to approximately 3000 psig;

the reaction condition including a reaction pressure ranging from approximately 20 psig to approximately 1000 psig;

the reaction condition including a reaction pressure ranging from approximately 20 to approximately 300 psig;

the reaction condition including a reaction pressure below approximately 300 psig;

the anhydrous solvent having a boiling point higher than 150° C.;

the anhydrous solvent having a boiling point higher than 200° C.;

the metal powder being a copper, zinc or aluminum powder;

the metal powder being a copper powder;

the metal powder being a zinc powder;

the metal powder being an aluminum powder;

the metal powder having an electrode potential lower than that of Pt;

the metal powder not interacting with $PF_3$ and not forming complexes with $PF_3$ under the reaction conditions;

the metal powder having a proper particle size range allowing it to stay in a powder form during the reaction process;

the metal powder having a particle size ranging from 200-900 microns;

the metal powder having a particle size ranging from 300-500 microns;

further comprising the step of
  synthesizing the platinum compound $Pt(Hal)_2(PF_3)_x$ (Hal=F, Cl, Br or I; x=1, 2) that includes the steps of:
    dispersing a platinum precursor having a general formula, $Pt(Hal)_2$, into the anhydrous solvent forming a suspension of $Pt(Hal)_2$, wherein Hal=F, Cl, Br or I;
    introducing $PF_3$ into the suspension of $Pt(Hal)_2$; and
    forming the solution of the platinum compound $Pt(Hal)_2(PF_3)_x$ (Hal=F, Cl, Br or I; x=1, 2) in the anhydrous solvent therefrom through a reaction of $PF_3$ and $Pt(Hal)_2$;

the platinum precursor $Pt(Hal)_2$ being anhydrous;

the platinum precursor $Pt(Hal)_2$ being $PtCl_2$;

the platinum precursor $Pt(Hal)_2$ being anhydrous $PtCl_2$;

the platinum compound $Pt(Hal)_2(PF_3)_x$ (Hal=F, Cl, Br or I, x=1, 2) being anhydrous;

the platinum compound $Pt(Hal)_2(PF_3)_x$ (Hal=F, Cl, Br or I, x=1, 2) being $PtCl_2(PF_3)_2$;

the platinum compound $Pt(Hal)_2(PF_3)_x$ (Hal=F, Cl, Br or I, x=1, 2) being anhydrous $PtCl_2(PF_3)_2$;

further comprising the steps of:
  purifying $Pt(PF_3)_4$ in a trap made of metal under air and moisture free conditions; and
  storing the purified $Pt(PF_3)_4$ under air and moisture free conditions in a container made of the metal,
  wherein the step of storing includes the steps of
    removing moisture from the inner surface of the container; and
    electro-polishing the inner surface of the container, or
    passivating the container with $PF_3$ before introducing the purified $Pt(PF_3)_4$;

the metal for the trap being selected from carbon steel, stainless steel, or stainless steel 316 alloy, respectively;

the metal for the container being selected from carbon steel, stainless steel, or stainless steel 316 alloy, respectively;

the anhydrous solvent being a hydrocarbon solvent;

the hydrocarbon solvent being selected form an oxyhydrocarbon solvent having a general formula $(C_nH_{2n+1})_2O$ (n≥1) and $H_3C(O(CH_2)_2)_nOCH_3$ (n≥1);

the hydrocarbon solvent being selected form an arene solvent having a general formula $(C_nH_{2n+1})_xC_6H_{6-x}$ (x≥1, n≥1);

the hydrocarbon solvent being selected form an alkane solvent having a general formula $C_nH_{2n+2}$ (n≥1);

the anhydrous solvent being a dried alkane solvent selected from decane, di-, tri-, tetra, penta- and hexadecane, the like;

the anhydrous solvent being a dried arene solvent selected from xylene, mesithylene, cymene, pentylbenzene, diisopropylbenzene, diisobutylbenzene, or the like;

the anhydrous solvent being a dried ether solvent selected from dibutyl ether, dihexyl ether, dioctyl ether, dimethyl ether of diethylene glycol, triethylene glycol dimethyl ether, tetraethylene glycol dimethyl ether or the like;

the anhydrous solvent being an arene solvent selected from xylene, mesithylene, cymene, pentylbenzene, diisopropylbenzene, diisobutylbenzene or the like;

the dried ether solvent being preferably dibutyl ether, dihexyl ether, dioctyl ether, triethylene glycol dimethyl ether, tetraethylene glycol dimethyl ether;

the dried arene solvent being preferably xylene, mesithylene, cymene, pentylbenzene, diisopropylbenzene, diisobutylbenzene;

the dried alkane solvent being preferably di-, tri-, tetra, penta- and hexadecane as well as a mixture of alkanes known as a mineral oil;

the anhydrous solvent being capable of dissolving the reaction intermediate;

the anhydrous solvent being capable of dissolving $Pt(Hal)_2(PF_3)_x$ (Hal=F, Cl, Br or I, x=1, 2);

the anhydrous solvent being capable of dissolving $PtCl_2(PF_3)_2$);

the anhydrous solvent not reacting with $Pt(PF_3)_4$;

the anhydrous solvent not reacting with $Pt(Hal)_2$ (Hal=F, Cl, Br or I);

the anhydrous solvent not reacting with $PtCl_2$;

the anhydrous solvent being xylene;

the anhydrous solvent being hexadecane;

a yield of $Pt(PF_3)_4$ being in a range of approximately 70-99.9%;

a yield of $Pt(PF_3)_4$ being in a range of approximately 70-95%;

a yield of $Pt(PF_3)_4$ being in a range of approximately 70-93%;

a purity of $Pt(PF_3)_4$ being more than 99% by weight;

a purity of $Pt(PF_3)_4$ being more than 99.5% by weight;

a purity of $Pt(PF_3)_4$ being approximately 90-99.9% by weight;

a purity of $Pt(PF_3)_4$ being approximately 99.0-99.9% by weight;

a purity of $Pt(PF_3)_4$ being approximately 99.5-99.9% by weight; and the formed $Pt(PF_3)_4$ being scalable to large industrial scale.

Also, disclosed is a method for manufacture and storage of $Pt(PF_3)_4$(CAS #19529-53-4), the method comprising the steps of:

a) forming a suspension of a platinum precursor $Pt(Hal)_2$, wherein Hal=F, Cl, Br or I, and a metal powder in an anhydrous solvent;

b) introducing excess amount of $PF_3$ into the suspension of $Pt(Hal)_2$ and the metal powder;

c) forming a soluble reaction intermediate $Pt(Hal)_2(PF_3)_x$ in the anhydrous solvent through a reaction of $PF_3$ and $Pt(Hal)_2$, wherein Hal=F, Cl, Br or I; x=1, 2, under a low pressure condition;

d) forming $Pt(PF_3)_4$ from a reaction between $Pt(Hal)_2(PF_3)_x$, the metal powder and $PF_3$ in the anhydrous solvent;

e) purifying $Pt(PF_3)_4$ under air and moisture free conditions in a trap made of metal; and f) storing the purified $Pt(PF_3)_4$ under the air and moisture free conditions in a container made of the metal. The disclosed method may include one or more of the following aspects:

the platinum precursor $Pt(Hal)_2$ being $PtCl_2$;

the anhydrous solvent having a boiling point higher than 150° C.;

the anhydrous solvent having a boiling point higher than 200° C.;

the anhydrous solvent being a hydrocarbon solvent selected form an oxyhydrocarbon solvent having a general formula $(C_nH_{2n+1})_2O$ (n≥1) and $H_3C(O(CH_2)_2)_nOCH_3$ (n≥1), an arene solvent having a general formula $(C_nH_{2n+1})_xC_6H_{6-x}$ (x≥1, n≥1) or an alkane solvent having a general formula $C_nH_{2n+2}$ (n≥1);

the anhydrous solvent being xylene or hexadecane;

the anhydrous solvent being capable of dissolving the reaction intermediate;

the anhydrous solvent being capable of dissolving $Pt(Hal)_2(PF_3)_x$ (Hal=F, Cl, Br or I, x=1, 2);

the anhydrous solvent being capable of dissolving $PtCl_2(PF_3)_2$);

the anhydrous solvent not reacting with $Pt(PF_3)_4$;

the anhydrous solvent not reacting with $Pt(Hal)_2$ (Hal=F, Cl, Br or I);

the anhydrous solvent not reacting with $PtCl_2$;

a reaction temperature ranging from approximately 30-200° C.;

a reaction temperature ranging from approximately 80-130° C.;

the low pressure condition being a pressure below about 300 psig;

the low pressure condition being a pressure ranging from approximately 20 to 300 psig;

the metal powder being a copper, zinc or aluminum powder;

the metal powder being a copper powder;

the metal powder having an electrode potential lower than that of Pt;

the metal powder not interacting with $PF_3$ and not forming complexes with $PF_3$ under the reaction conditions;

the metal powder having a proper particle size range allowing it to stay in a powder form during the reaction process;

the metal powder having a particle size ranging from 200-900 microns;

the metal powder having a particle size ranging from 300-500 microns;

a yield of $Pt(PF_3)_4$ being in the range of approximately 70-99.9%;

a yield of $Pt(PF_3)_4$ being in a range of approximately 70-95%;

a yield of $Pt(PF_3)_4$ being in a range of approximately 70-93%;

a purity of $Pt(PF_3)_4$ being approximately 90-99.9 wt. % after purification;

a purity of $Pt(PF_3)_4$ being 99.0-99.9 wt. % after purification;

the metal for the trap and the metal for the container being selected from carbon steel, stainless steel, or stainless steel 316 alloy, respectively; and further comprising the steps of:

electro-polishing the inner surface of the container, or passivating the container with $PF_3$ before introducing of the purified $Pt(PF_3)_4$.

Also, disclosed is a method for manufacture and storage of $Pt(PF_3)_4$(CAS #19529-53-4), the method comprising the steps of:

a) forming a suspension of a platinum precursor $Pt(Cl)_2$ in an anhydrous solvent selected form xylene or hexadecane;

b) introducing excess amount of $PF_3$ into the suspension of $Pt(Cl)_2$ to form a solution of $Pt(Cl)_2(PF_3)_x$ (x=1, 2) in the anhydrous solvent therefrom through a reaction of $PF_3$ and $Pt(Cl)_2$;

c) adding a copper powder into the solution of $Pt(Cl)_2(PF_3)_x$ (x=1, 2);

d) forming $Pt(PF_3)_4$ from a reaction between the copper powder, $PF_3$ and $Pt(Cl)_2(PF_3)_x$ in the anhydrous solvent in a reaction temperature ranging from 30-200° C. and a reduced $PF_3$ pressure ranging from 20 to 300 psig;

e) purifying $Pt(PF_3)_4$ under air and moisture free conditions in a trap made of stainless steel; and f) storing the purified $Pt(PF_3)_4$ under the air and moisture free conditions in a container made of the stainless steel, wherein the inner surface of the container is electro-polished or passivated with $PF_3$. The disclosed method may include one or more of the following aspects:

the copper powder having a particle size ranging from 200-900 microns; and the copper powder having a particle size ranging from 300-500 microns.

NOTATION AND NOMENCLATURE

The following detailed description and claims utilize a number of abbreviations, symbols, and terms, which are generally well known in the art. While definitions are typically provided with the first instance of each acronym, such as, stainless steel (SS). Certain abbreviations, symbols, and terms are used throughout the following description and claims, and include the followings.

The following detailed description and claims utilize a number of abbreviations, symbols, and terms, which are generally well known in the art.

As used herein, the indefinite article "a" or "an" means one or more.

As used herein, "about" or "around" or "approximately" in the text or in a claim means ±10% of the value stated.

As used herein, "room temperature" in the text or in a claim means from approximately 18° C. to approximately 25° C.

As used herein, "atmospheric pressure" in the text or in a claim means approximately 1 atm.

The standard abbreviations of the elements from the periodic table of elements are used herein. It should be understood that elements may be referred to by these abbreviation (e.g., Si refers to silicon, N refers to nitrogen, O refers to oxygen, C refers to carbon, H refers to hydrogen, Hal refers to halogens, which are F, Cl, Br, I).

The unique CAS registry numbers (i.e., "CAS") assigned by the Chemical Abstract Service are provided to identify the specific molecules disclosed.

As used herein, the term "hydrocarbon" refers to a saturated or unsaturated function group containing exclusively carbon and hydrogen atoms.

As used herein, the term "low pressure", "low reaction pressure" or "low $PF_3$ pressure" refers to a pressure below 300 psig or below 20 atm. The same applies to "reduced pressure" that refers to a pressure reduced or lowered to below 300 psig or 20 atm. In some cases, "low pressure", "low reaction pressure" or "low $PF_3$ pressure" may refer to a pressure range ranging from 20 psig to 300 psig.

Ranges may be expressed herein as from about one particular value, and/or to about another particular value. When such a range is expressed, it is to be understood that another embodiment is from the one particular value and/or to the other particular value, along with all combinations within said range. Any and all ranges recited herein are inclusive of their endpoints (i.e., x=1 to 4 or x ranges from 1 to 4 includes x=1, x=4, and x=any number in between), irrespective of whether the term "inclusively" is used.

Reference herein to "one embodiment" or "an embodiment" means that a particular feature, structure, or characteristic described in connection with the embodiment may be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

BRIEF DESCRIPTION OF THE DRAWINGS

The foregoing and various other aspects, features, and advantages of the present invention, as well as the invention itself, may be more fully appreciated with reference to the following detailed description of the invention when considered in connection with the following drawings. The drawings are presented for the purpose of illustration only and are not intended to be limiting of the invention, in which.

DESCRIPTION OF PREFERRED EMBODIMENTS

Figure 1:
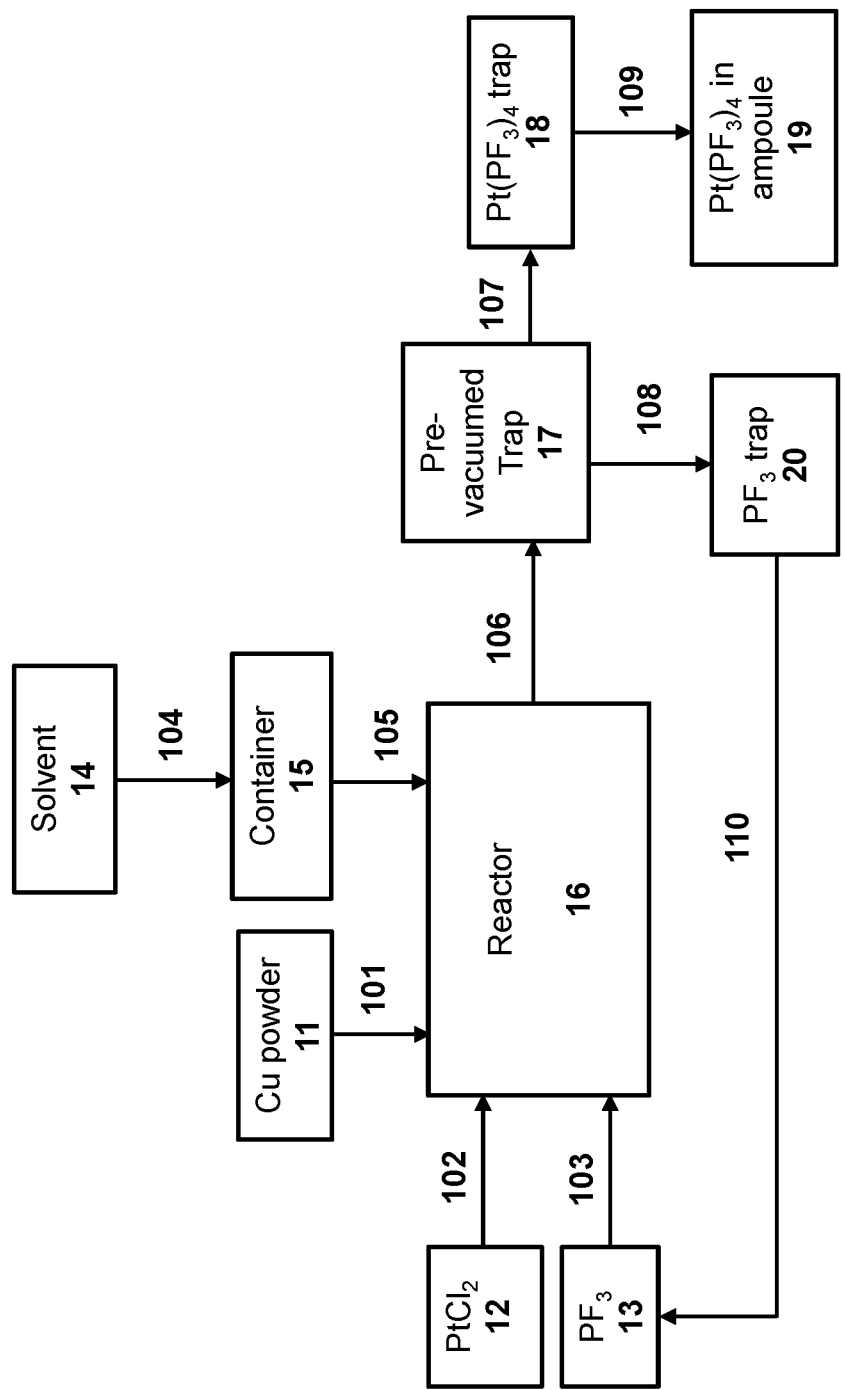
FIG. 1 is a block diagram of exemplary disclosed system of synthesizing $Pt(PF_3)_4$.

Disclosed are methods for synthesis, producing, manufacture and storage of $Pt(PF_3)_4$(CAS #19529-53-4). The disclosed methods are capable of a scale up production of $Pt(PF_3)_4$ in a high yield and the produced $Pt(PF_3)_4$ may be used as a precursor for Pt-containing film deposition in microelectronic devices or in catalyst industries.

The disclosed synthesis methods may be a 2-steps wet synthesis of $Pt(PF_3)_4$ using insoluble platinum compound $Pt(Hal)_2$ (Hal=F, Cl, Br or I) and a soluble reaction intermediate, a platinum compound $Pt(Hal)_2(PF_3)_x$ (Hal=F, Cl, Br or I; x=1, 2), which includes formation of the soluble reaction intermediate from the insoluble $Pt(Hal)_2$ (Hal=F, Cl, Br or I) suspension in low pressure conditions and a reaction of the soluble intermediate with a metal powder and a co-reactant, such as $PF_3$, to form $Pt(PF_3)_4$.

Alternatively, since the soluble intermediate $Pt(Hal)_2(PF_3)_x$ (Hal=F, Cl, Br or I; x=1, 2) can be isolated and purified, the disclosed synthesis methods may be a 1-step wet synthesis of $Pt(PF_3)_4$ using the soluble $Pt(Hal)_2(PF_3)_x$ (Hal=F, Cl, Br or I; x=1, 2) to react with a metal powder and a co-reactant, such as $PF_3$, to form $Pt(PF_3)_4$ under certain reaction conditions. Preferably, Hal=Cl. Preferably, a metal powder is a copper powder.

Furthermore, the disclosed are robust, high yield and scalable syntheses of $Pt(PF_3)_4$, which may proceed under a low pressure and may be performed in common reactors or apparatus. More specifically, $Pt(PF_3)_4$ may be synthesized from a platinum compound selected from $Pt(Hal)_2$ (Hal=F, Cl, Br or I) or $Pt(Hal)_2(PF_3)_x$ (Hal=F, Cl, Br or I; x=1, 2), with $PF_3$ and a metal powder, such as a copper powder, under a low $PF_3$ pressure, in an anhydrous solvent. The metal powder may have a particle size ranging from approximately 200-900 microns, preferably from approximately 300-500 microns. The anhydrous solvent may be capable of dissolving $Pt(Hal)_2(PF_3)_x$ (Hal=F, Cl, Br or I; x=1, 2), a reaction intermediate, in which $Pt(Hal)_2(PF_3)_x$ (Hal=F, Cl, Br or I; x=1, 2) may form from $Pt(Hal)_2$ and $PF_3$ under the certain reaction conditions, such as under a low pressure condition. Herein, the platinum compound $Pt(Hal)_2(PF_3)_x$ (Hal=F, Cl, Br or I; x=1, 2) can be isolated and purified for using as a reactant or a starting material for synthesis of $Pt(PF_3)_4$. A yield of $Pt(PF_3)_4$ using the disclosed synthesis methods may be in a range of approximately 70-99.9%. The disclosed also includes purification processes of the product $Pt(PF_3)_4$ through metal traps and storage conditions of the purified $Pt(PF_3)_4$ in a vessel. $Pt(PF_3)_4$ may be stored under air and moisture free conditions in apparatus and ampoules fabricated from stainless steel and preferably having a passivated or electro-polished inner surface. $Pt(PF_3)_4$ may be stored in a metal vessel at room temperature without changing of its purity, such as a stainless steel vessel and an inner surface passivated or electro-polished stainless steel vessel.

As described above, the absence of scalable method in the art may be because commonly available reactors for pilot plant syntheses and high volume manufactures are not designed to operate under a high pressure and not designed for efficient stirring (mixing) of air sensitive solids. Namely, commercially available (e.g. from High Pressure Equipment Company) reactors capable of operation under a high pressure about 100 atm do not have a stirring capability, which is essential for reaction to proceed. In addition, commercially available reactors (e.g. from Buchiglas USA) are difficult to cool down to even dry ice temperature necessary to condense $PF_3$ in the reactor. Stirring of solids could be improved to some extend using a specially designed stirring shafts, but would not solve a parasitic reaction, such as $PtCl_2$/Cu, which leads to platinum metal and reduces the yield of $Pt(PF_3)_4$. In addition, impurities are difficult to remove, requiring expensive and uncertain additional purification steps.

The disclosed methods for a robust, high yield and scalable synthesis of $Pt(PF_3)_4$ may proceed under a low $PF_3$ pressure, e.g., below 20 atm, and may be performed on commonly used commercially available reactors. The disclosed method is a significant advancement in the art to provide a method capable of producing a scale-up production of $Pt(PF_3)_4$ with a high yield, since up to date a potentially ideal $Pt(PF_3)_4$ precursor has not applied only due to the absence of a scalable synthesis method. The reason of the absence of the scalable synthesis method is that commonly used commercially available reactors for pilot plant syntheses and high volume manufacture are not designed for operation under a high pressure (e.g., 30 atm or higher) and not designed for efficient stirring (mixing) of air sensitive solids, as stated above.

The disclosed methods may have proven for the first time that reaction aimed for synthesis of $Pt(PF_3)_4$ with $PtCl_2$+$PF_3$+Cu in a solvent goes through the sufficiently soluble intermediate $PtCl_2(PF_3)_2$ at reaction conditions (e.g., low pressure from 20 to 300 psig and temperature from 80 to 130° C.), when starting materials $Pt(Hal)_2$ (Hal=F, Cl, Br or I) is $PtCl_2$ and the metal powder is a Cu powder. A common knowledge is that solubility of inorganic compound such as $PtCl_2(PF_3)_2$ is lower in saturated hydrocarbon solvent than in arene solvent benzene and hence counting on solubility in hydrocarbon solvent hexadecane is counterintuitive as well as counting on reaction with such low solubility even in an arene solvent.

$Pt(PF_3)_4$ was normally prepared from $PtCl_2$, $K_2PtCl_6$ and $K_2PtCl_6$ according to the prior art, while $K_2PtCl_6$ is required to lower $PF_3$ pressure. Both $PtCl_2$ and $K_2PtCl_6$ are insoluble in the disclosed solvents (e.g., arenes, saturated hydrocarbons). As shown in the examples and comparative examples that follow, the solvent effects are not similar for platinum starting compounds, e.g. for $PtCl_2$ (Example 1, Table 1, comparative example 1) and for $K_2PtCl_6$ (Example 7, Table 5). While addition of the disclosed solvent (e.g., xylene, hexadecane) is beneficial for reaction starting from $PtCl_2$, the neat reaction without solvent with starting compound $K_2PtCl_6$:

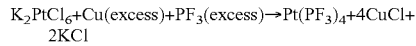

$K_2PtCl_6$+Cu(excess)+$PF_3$(excess)→$Pt(PF_3)_4$+4CuCl+ 2KCl has a higher yield of $Pt(PF_3)_4$ than the reaction starting from $K_2PtCl_6$ in the solvent hexadecane, showing that the solvent benefit is beneficial to certain Pt precursors such as $PtCl_2$, $PtF_2$, $PtI_2$, $PtBr_2$ or the like. Hence using solvent for the synthesis of $Pt(PF_3)_4$ from $Pt(Hal)_2$ (Hal=F, Cl, Br or I) is novel.

FIG. 1 is a block diagram of an exemplary disclosed solid-gas $PtCl_2$+$PF_3$+Cu system for synthesis of $Pt(PF_3)_4$. As shown, at first, a metal powder, such as Cu powder 11 is added to reactor 16 through line 101. Anhydrous solvents are used as solvent 14 in the disclosed process. The applied solvents for solvent 14 may have moisture from 0 to 50 ppm, preferably from 0 to 10 ppm of moisture, more preferably 0 to 1 ppm of moisture. Solvent 14 may be dried by contacting with a drying agent selected from 3 Å or 4 Å molecular sieves or an activated alumina through drying process 104. Drying process 104 could be done at a temperature range from 10-50° C., preferably at room temperature, within 0.5 hours to 20 hours. In some embodiments, drying process 104 may be achieved by keeping the solvent with the molecular sieves in container 15 or by passing through a column (not shown) with a drying agent in drying process 104. The moisture content in container 15 after drying may be determined by Karl Fischer titration or any other suitable analysis. Solvent 14 may be a commercially available solvent and may be degassed by applying vacuum-inert gas cycles or by passing the inert gas with less than 0.5 ppm of $O_2$ and moisture before contacting with the drying agent. Solvent or anhydrous solvent 14 may be stored in container 15 or directed to reactor 16 via line 105 right after drying process 104. Container 15 with the dried anhydrous solvent 14 could be stored before the next step, or transported to other place where reactor 16 is located.

Afterward, $PtCl_2$ 12 is charged into reactor 16 under an inert atmosphere (e.g., nitrogen, argon, helium) by any suitable means, e.g. applying solid addition funnel 102. $PtCl_2$ 12 may be anhydrous $PtCl_2$. In the following, $PF_3$ 13 is charged into reactor 16 via addition line 103 by pressure difference, while reactor 16 may be pre-vacuumed and heated, or at room temperature and pre-vacuumed, or containing $PF_3$ at a certain pressure and temperature. Reactor 16 may be vacuumed up to 0.1-50 Torr, preferably up to 0.1-2 Torr to remove the inert gas selected from nitrogen, argon, helium, before addition of $PF_3$. Absence of the non-condensable gas (nitrogen, argon, helium) in reactor 16 will make distillation of the product $Pt(PF_3)_4$ more efficient. Alternatively, $PF_3$ added to reactor 16 may contain 1 atm of nitrogen, argon or helium at room temperature. The addition of $PF_3$ 13 in reactor 16 creates a $PF_3$ pressure from 20 psig to 300 psig in reactor 16. $PF_3$ may be added by portions or continuously during the process. The value of the $PF_3$ pressure depends on the pressure rating of the applied reactor and may be added by portions or continuously during the process and recycled after the process.

Reactor 16 may be a typical vessel with means of agitation, temperature and pressure controls and reaction monitoring, applied to synthesis and purification of $Pt(PF_3)_4$. Reactor 16 has a cooling and heating device that is maintained at a temperature ranging from approximately −120° C. to approximately 200° C., preferably from room temperature to 180° C., more preferably from room temperature to 130° C., and the corresponding pressure from approximately 10 psig to approximately 3000 psig, preferably from approximately 20 psig to approximately 1000 psig, more preferable from approximately 20 psig to approximately 300 psig. Reactor 16 is connected to an empty vessel serving as ballast and has a vent to vent the reaction content if over pressurized. Reactor 16 is connected to a nitrogen and vacuum line (not shown) and a $PF_3$ scrubber (not shown) as well as traps 18 and 20 for collection of the product $Pt(PF_3)_4$ through line 107 and recycling unreacted $PF_3$ through line 110.

Solvent 14 may include various organic solvents. In some embodiments, solvent 14 may be a dried alkane solvent selected from decane, di-, tri-, tetra, penta- or hexadecane. In this case, Cu powder 11, anhydrous $PtCl_2$ 12, and dried alkane solvent 14 are loaded in reactor 16 forming a suspension. The starting amount of $PtCl_2$ solid in solvent 14 is from 1% to 50%, preferably from 5% to 40%, more preferably from 20% to 30%. The molar ratio of the $PtCl_2$ 12 to Cu powder 11 is from 1:2 to 1:20, preferably from 1:6 to 1:10. That is, the molar ratio of the Pt to Cu is from 1:2 to 1:20, preferably from 1:6 to 1:10. Reactor 16 is vacuumed to 0.1-50 Torr, preferably to 0.2-5 Torr prior to introducing of $PF_3$ 13.

Alternatively, solvent 14 may be a dried arene solvent selected from xylene, mesithylene, cymene, pentylbenzene, diisopropylbenzene, or diisobutylbenzene. In this case, Cu powder 11, anhydrous $PtCl_2$ 12, and dried arene solvent 14 are loaded in reactor 16. The starting amount of $PtCl_2$ solid in solvent is from 1% to 50% preferably from 10 to 40%, more preferably from 20% to 30%. The molar ratio of the $PtCl_2$ to Cu is from 1:2 to 1:20, preferably from 1:6 to 1:10. That is, the molar ratio of the Pt to Cu is from 1:2 to 1:20, preferably from 1:6 to 1:10. Reactor 16 is vacuumed to 0.1-50 Torr, preferably to 0.2-5 Torr prior to introducing of $PF_3$ 13.

Alternatively, solvent 14 may be a dried ether solvent selected from dibutyl ether, dihexyl ether, dioctyl ether, dimethyl ether of diethylene glycol, triethylene glycol dimethyl ether, tetraethylene glycol dimethyl ether. In this case, Cu powder 11, anhydrous $PtCl_2$ 12, and dried ether solvent 14 are loaded in reactor 16. The starting amount of $PtCl_2$ solid in solvent is from 1% to 50% preferably from 10 to 40%, more preferably from 20% to 30%. The molar ratio of the $PtCl_2$ to Cu is from 1:2 to 1:20, preferably from 1:6 to 1:10. That is, the molar ratio of the Pt to Cu is from 1:2 to 1:20, preferably from 1:6 to 1:10. Reactor 16 is vacuumed to 0.1-50 Torr, preferably to 0.2-5 Torr prior to introducing of $PF_3$ 13.

Figure 3:
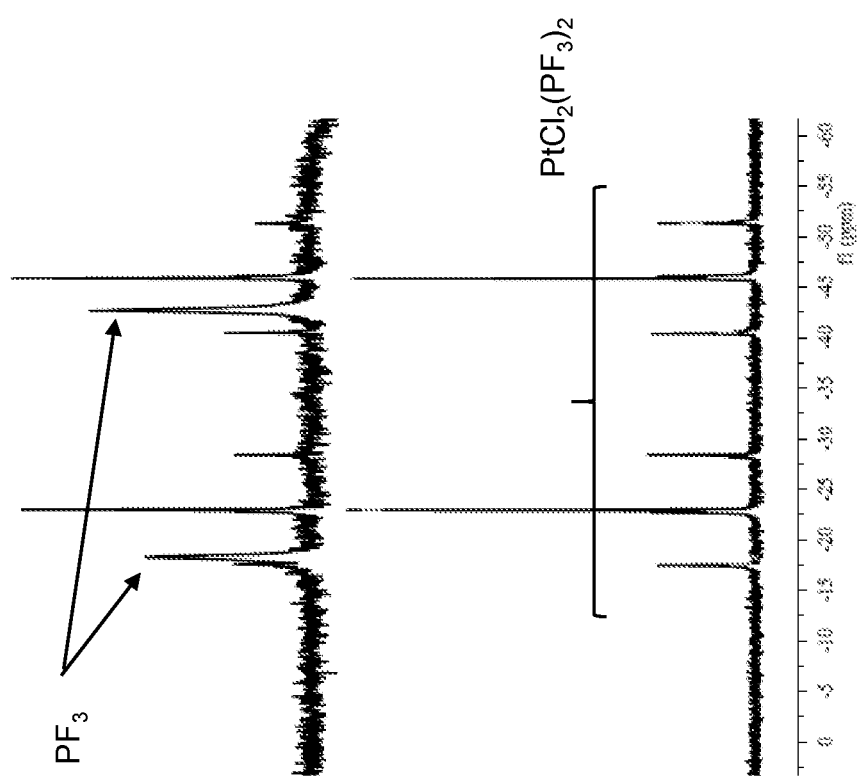
FIG. 3 is $^{19}F$ NMR spectra of $PtCl_2(PF_3)_2$ crystals and supernatant hexadecane solution of reaction mixture stopped on the stage $PtCl_2(PF_3)_2$.

After introducing $PF_3$ 13 into reactor 16, a reaction mixture initially is a suspension of $PtCl_2$ 12 and Cu powder 11 in solvent 14 under the pressure of $PF_3$ 13. Then heating reactor 16 with stirring the reaction mixture, $PtCl_2(PF_3)_x$ (x=1, 2) are formed in a temperature range from 20 to 120° C., preferably in a temperature range from 90-120° C. The reaction may be stopped after 20-80 minutes of heating with stirring in above preferred temperature ranges and $PtCl_2(PF_3)_2$ may be isolated from the solvent, reaction byproducts, residual $PF_3$, etc. Compounds $PtCl_2(PF_3)_x$ (x=1, 2) are soluble in solvent 14 that may be proven by means of NMR spectroscopy, as shown in FIG. 3. The reaction continues in reactor 16 under the pressure of $PF_3$ while $PF_3$ and $PtCl_2(PF_3)_x$ (x=1, 2) are dissolved in the solvent and react with copper powder 11. During the course of reaction, $PF_3$ 13 is consumed. $PF_3$ 13 could be added by portions in reactor 16 or continuously maintain a constant selected pressure. When all starting and intermediate platinum compounds are consumed, the pressure in reactor 16 becomes constant at a given temperature.

The reaction time may be in the range of 1 hour to 24 hours, preferably from 4 hours to 8 hours. The degree of conversion may be monitored by a consumption rate of $PF_3$ and pressure change in reactor 16 through in-situ Raman spectroscopy or any other suitable technique.

In some embodiments, the reaction in reactor 16 occurs in hexadecane, under 20 to 50 psig of $PF_3$, at the temperatures 100 to 125° C. and finished in 6 hours.

Alternatively, in some embodiments, the reaction in reactor 16 occurs in xylenes, under 20 to 40 psig of $PF_3$, at the temperatures from 100 to 125° C. and finished in 5 hours.

After the reaction finishes, the reaction mixture is cooled to 20 to 65° C., preferably 30 to 45° C. The remaining gases consisting of $PF_3$, $Pt(PF_3)_4$ and solvent are directed to pre-vacuumed trap 17 maintained in a temperature ranging from −196° C. to −160° C. $PF_3$ (melting point −151.5° C., boiling point −101.9° C.) and $Pt(PF_3)_4$ (melting point −15° C.) and the solvent are condensed in pre-vacuumed trap 17. At the end of $Pt(PF_3)_4$ condensation in pre-vacuumed trap 17, vacuum may be applied in periods to remove the residual gases such as nitrogen, argon, helium, to create a vacuum in the range of 0.1 to 50 Torr, preferably 0.2 to 2 Torr in order to facilitate the distillation of remaining $Pt(PF_3)_4$ from reactor 16 in pre-vacuumed trap 17. Pre-vacuumed trap 17, $Pt(PF_3)_4$ trap 18 and $PF_3$ trap 20 are pre-vacuumed to 0.01-10 Torr, preferably to 0.1-1 Torr before condensing the reaction products including $Pt(PF_3)_4$ and $PF_3$.

Alternatively to the procedure described above, after the reaction finishes, the reaction mixture is cooled down to 20-65° C., preferably to 30-45° C. and a portion of gases containing $PF_3$, $Pt(PF_3)_4$ and solvent is directed to pre-vacuumed trap 17 through line 106 maintained in a temperature ranging from −60 to −80° C. $PF_3$ is not condensed, while $Pt(PF_3)_4$ and solvent are condensed in pre-vacuumed trap 17. After $Pt(PF_3)_4$ and solvent are condensed in pre-vacuumed trap 17, the non-condensed $PF_3$ is directed by pressure difference from pre-vacuumed trap 17 to $PF_3$ trap 20 maintained in a temperature ranging from −160 to −196° C., then the next portion of gases containing $PF_3$, $Pt(PF_3)_4$ and solvent is directed in pre-vacuumed trap 17 from reactor 16 and the cycle continues until all $PF_3$ is condensed in $PF_3$ trap 20 and all $Pt(PF_3)_4$ is condensed in pre-vacuumed trap 17.

The condensation of gaseous products is preferably done by steps, as described above, where a continuous process is disclosed, since even with the efficient engineering and cooling of pre-vacuumed trap 17 with dry ice-isopropanol (−79° C.), the continuous flow of gases from reactor 16 will result in bypassing 108 of 20-60% of $Pt(PF_3)_4$ in $PF_3$ trap 20 leading to an additional steps (not shown) to recover all $Pt(PF_3)_4$ from $PF_3$ trap 20. The additional steps may include warming up trap 20 above the boiling point of $PF_3$ (−102° C.), commonly to −79° C. (dry ice cooling) and capture all $PF_3$ in a first separate trap (not shown) cooled with liquid nitrogen. After all $PF_3$ is captured, trap 20 is warmed up to room temperature and $Pt(PF_3)_4$ is captured in a second separate trap (not shown). The captured $PF_3$ in the first separate trap may be recycled to $PF_3$ 13 through line 110 for synthesize in reactor 16. Pre-vacuumed trap 17, $Pt(PF_3)_4$ trap 18 and $PF_3$ trap 20 and all connecting lines are fabricated from or made of metal, where the metal material is preferably carbon steel, stainless steel and stainless steel alloy. In some embodiments, pre-vacuumed trap 17, $Pt(PF_3)_4$ trap 18 and $PF_3$ trap 20 and all connecting lines are made of stainless steel. All traps may have a passivated or electro-polished inner surface.

$Pt(PF_3)_4$ is separated from $PF_3$ by fractional distillation under air and moisture free conditions. After collection of volatile species, pre-vacuumed trap 17 is warmed to a temperature ranging from −20 to −90° C., preferably from −60 to −80° C. and $PF_3$ is distilled in $PF_3$ trap 20 maintained in a temperature ranging from −160 to −196° C. $PF_3$ in $PF_3$ trap 20 may be stored, moved to a different location or recycled as $PF_3$ 13 for next synthesis.

$Pt(PF_3)_4$ contaminated with the solvent, reaction byproducts such as solid copper chlorides is remaining in pre-vacuumed trap 17 after $PF_3$ uptake. $Pt(PF_3)_4$ in pre-vacuumed trap 17 has purity 90-99% and contain 0.1-5% of $PF_3$ and 0.1-10% of solvent and 0.1-1% of other impurities preferably being phosphorus oxofluorides and solid copper chlorides. $Pt(PF_3)_4$ and solvent, solids are separated if a mixture is kept in a temperature ranging from 10 to 40° C., preferably at room temperature and a receiver is kept in a temperature ranging from −50 to −196° C., while the apparatus and the receiver may be pre-vacuumed before the distillation and the pressure during the distillation is 0.01 Torr to 760 Torr, preferably from 0.1 Torr to 5 Torr. More specifically, $Pt(PF_3)_4$ collected in pre-vacuumed trap 17 is purified by distillation in $Pt(PF_3)_4$ trap 18. In one embodiment, pre-vacuumed trap 17 containing $Pt(PF_3)_4$ after $PF_3$ uptake is warmed to 0 to 40° C., preferably to room temperature and $Pt(PF_3)_4$ is distilled in pre-vacuumed trap 17 at a pressure from 0.01-50 Torr, preferably 0.1-2 Torr, while $Pt(PF_3)_4$ trap 18 kept in a temperature ranging from −15 to −196° C.

$Pt(PF_3)_4$ collected in $Pt(PF_3)_4$ trap 18 has a purity of 70-99.9% w/w, preferably 80-99.9% w/w, more preferably 90-99.9% w/w, even more preferably 95-99.9% w/w, even more preferably 99.0-99.99% w/w after purification. Preferably, $Pt(PF_3)_4$ collected has a purity of 99.50-99.99% w/w and contains 0-0.5% of $PF_3$, 0.01-0.5% of other impurities, such as phosphorus oxofluorides, thermal decomposition products such as $Pt_4(PF_3)_8$ and 0-0.5% of residual solvent. Purity of $Pt(PF_3)_4$ determined by $^1H$, $^{19}F$, $^{31}P$, $^{195}Pt$ NMR, FTIR, and Raman spectroscopy.

The purified $Pt(PF_3)_4$ may have an impurity of from approximately 0 wt. % to approximately 0.1 wt. % of $PF_3$, preferably from approximately 0 wt. % to approximately 0.05 wt. % of $PF_3$. The purified $Pt(PF_3)_4$ may have between approximately 0 wt. % to approximately 1 wt. % of phosphorus fluorides and oxofluorides including $PF_3$, $POF_3$, $(HO)POF_2$, $(HO)_2POF$, preferably between approximately 0 wt. % to approximately 0.05 wt. %. The purified $Pt(PF_3)_4$ may have between 0 wt. % to approximately 0.1 wt. % platinum compounds other than $Pt(PF_3)_4$. Preferably, approximately 0 wt. % to approximately 0.05 wt. % of platinum compounds other than $Pt(PF_3)_4$. The total concentration of $Pt(Hal)_2$, $Pt_4(PF_3)_8$, $Pt(Hal)_2(PF_3)_x$ (Hal=F, Cl, Br or I, x=1, 2) in $Pt(PF_3)_4$ may be from approximately 0 wt. % to approximately 0.1 wt. %, preferably from approximately 0 wt. % to approximately 0.05 wt. % after purification. Furthermore, the purified $Pt(PF_3)_4$ may have between 0.1 ppmw to 1000 ppmw of solvent utilized for synthesis, preferably from approximately 0 ppmw to 200 ppmw of solvent, more preferably from 0 ppmw to 50 ppmw of solvent, even more preferably from 0 ppmw to 20 ppmw of solvent. Moreover, the purified $Pt(PF_3)_4$ may have from approximately 0 ppmw to approximately 100 ppmw of hydrogen fluoride, from 0 ppmw to approximately 50 ppmw of hydrogen chloride. In addition, the purified $Pt(PF_3)_4$ may have between approximately 0 ppb to 10 ppm of trace metals, such as iron, nickel, manganese, cobalt, copper, etc. The residual $PF_3$ is recycled for synthesis of $Pt(PF_3)_4$.

In some embodiments, in order to determine the amount of organic compounds in $Pt(PF_3)_4$, the internal standard, such as $Me_4Si$, may be used. In some embodiments, the sample preparation may involve absorbing the organic solvent with the proper adsorbent such as $C_8$ derivatized silica gel.

In some embodiments, $Pt(PF_3)_4$ trap 18 may include two subsequent traps, e.g., trap 18a and trap 18b (not shown) for distillations to achieve the desired purity of $Pt(PF_3)_4$. After purification, $Pt(PF_3)_4$ may be stored in $Pt(PF_3)_4$ trap 18 prior to packaging in metal ampoule 19 for shipment, deposition or storage. Alternatively, $Pt(PF_3)_4$ may be stored in metal ampoule 19 after packaging 109. Metal ampoule 19 may be a metal container/vessel that is made of made of a metal, such as stainless steel, carbon steel, and stainless steel 316 alloy. The inner surface of metal ampoule 19 may be passivated with $PF_3$ or electro-polished.

The moisture from the surface of metal $Pt(PF_3)_4$ trap 18, metal ampoule 19 may be removed by heating under vacuum at approximately 100 to 170° C. before introducing $Pt(PF_3)_4$ into metal $Pt(PF_3)_4$ trap 18 and metal ampoule 19. Alternatively, the moisture from the surface of metal $Pt(PF_3)_4$ trap 18, metal ampoule 19 may be removed by passivating the trap vessels with $PF_3$ before introducing $Pt(PF_3)_4$ into metal $Pt(PF_3)_4$ trap 18 and metal ampoule 19.

The purified $Pt(PF_3)_4$ may be stored in metal $Pt(PF_3)_4$ trap 18, metal ampoule 19 in the temperature range −80 to 60° C., preferably from 10 to 40° C., more preferably from 20 to 25° C. The disclosed methods include storing $Pt(PF_3)_4$ in a metal container, such as a stainless steel, carbon steel, and stainless steel 316 alloy container. The inner surface of the metal container may be passivated with $PF_3$ or electro-polished. Here the stainless-steel container may be a stainless steel single-ended miniature sample cylinder or an electro-polished stainless-steel miniature canister. In one exemplary embodiment, the purified $Pt(PF_3)_4$ was stored in a stainless steel single-ended miniature sample cylinder at room temperature for 2 months without change of $Pt(PF_3)_4$ purity. Alternatively, the purified $Pt(PF_3)_4$ was stored in an electro-polished stainless-steel miniature canister at room temperature for 2 months without change of $Pt(PF_3)_4$ purity.

Figure 2A:
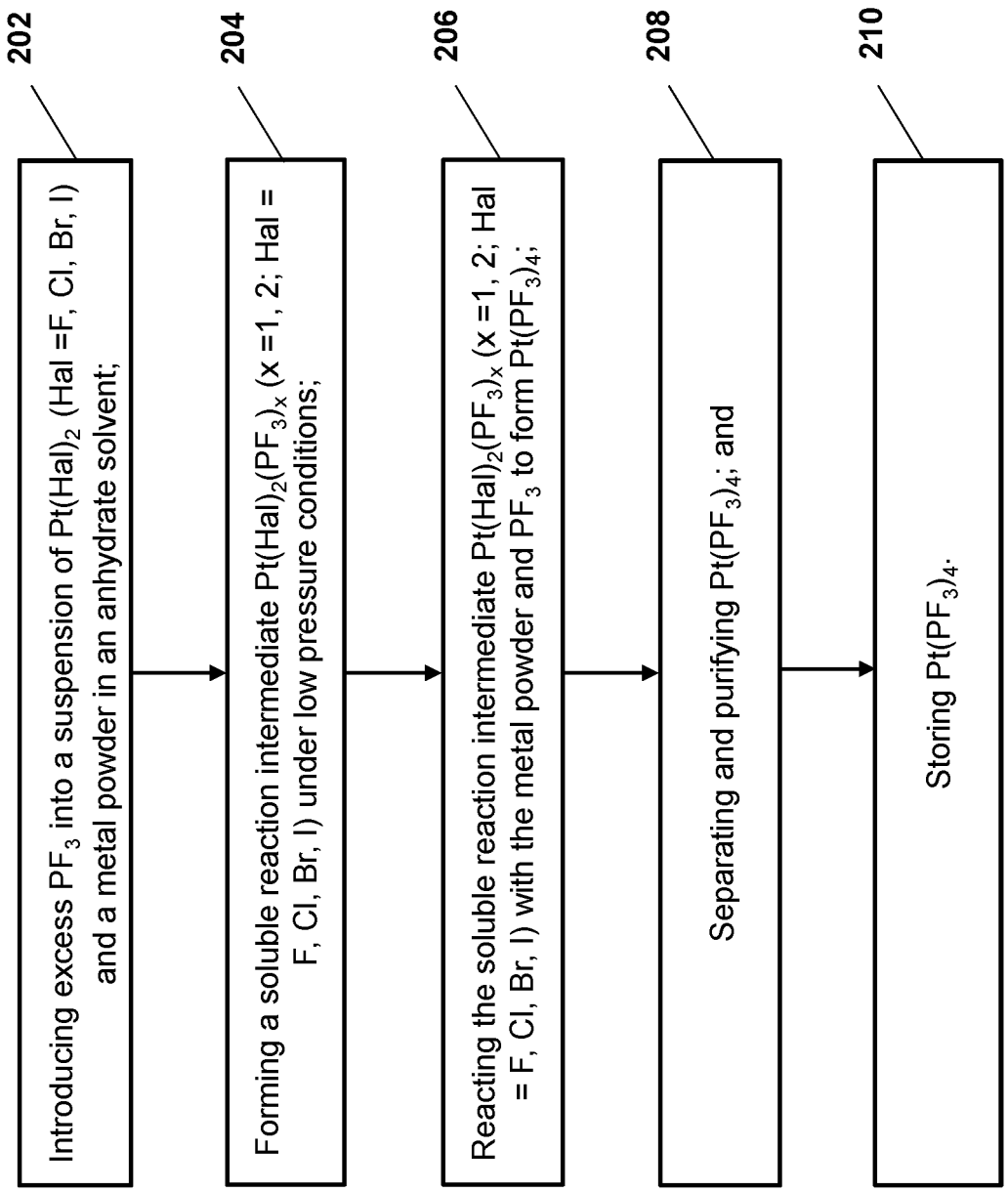
FIG. 2a is a flowchart of an exemplary disclosed process of synthesizing $Pt(PF_3)_4$ starting with $Pt(Hal)_2$ (Hal=F, Cl, Br or I)

The disclosed methods may be represented by a step process through a soluble intermediate, $Pt(Hal)_2(PF_3)_x$ (x=1, 2; Hal=F, Cl, Br or I), as shown in FIG. 2a, a so-called solid-gas, $Pt(Hal)_2$-M-$PF_3$, synthesis process in solution. Here HAL is F, Cl, Br or I, preferably Hal is Cl; M is metal (such as Cu), then a $Pt(Hal)_2$-M-$PF_3$ synthesis process becomes a $PtCl_2$—Cu—$PF_3$ synthesis process. The disclosed method produces $Pt(PF_3)_4$ in a high yield (i.e., 70 to 99.9%) with a high purity (i.e., more than 99%, preferably more than 99.99%) and allows storage and delivery of the highly pure $Pt(PF_3)_4$ without degrading the purity. Using a hydrocarbon solvent is advantageous of the disclosed solid-gas, $PtCl_2$—Cu—$PF_3$, reaction process, in which the solvent is capable of dissolving the reaction intermediate (e.g., a platinum complex $PtCl_2(PF_3)_2$) formed from insoluble starting materials, solid platinum compound $PtCl_2$ and $PF_3$ gas, under proper reaction conditions, and does not react with $Pt(PF_3)_4$. Utilization of such solvent allows obtaining $Pt(PF_3)_4$ in a high yield, at a shorter time, under low $PF_3$ pressure. Due to the lower pressure of $PF_3$ in the disclosed synthesized method of $Pt(PF_3)_4$, cooling the reactor to condense $PF_3$ is eliminated and reactors with lower pressure rating could be used. As a result, commonly available equipment and reactors could be utilized for the disclosed synthesis method of $Pt(PF_3)_4$. This results in a $Pt(PF_3)_4$ synthesis process that is scalable to large industrial scale, with limited required equipment complexity due to its lower pressure requirement. The reaction conditions here include reaction temperature, reaction pressure and so on.

With the disclosed synthesis methods, the problem of low, moderate and irreproducible yield in the solid-gas reactions as well as a high pressure of $PF_3$ required for synthesis of $Pt(PF_3)_4$ is solved by addition of the disclosed solvent in the $PtCl_2$—Cu—$PF_3$ reaction system. Addition of solvent allows a synthesis of $Pt(PF_3)_4$ under a low $PF_3$ pressure, in a shorter time, with the reproducible high yield (Table 1, Examples #1 to #4). The reason for improvement in the synthesis process is solubility of $PtCl_2(PF_3)_2$ obtained in situ from $PtCl_2$ and $PF_3$ under the low pressure reaction conditions. It is a common knowledge that solution-solid reactions are much more efficient than the reaction between two different solids and gas. The addition of the solvent makes the solid-gas, PtCl$_2$—Cu—PF$_3$, reaction system change to a solution-solid reaction that is much more efficient. Although application of solvent in synthesis is a common practice, it is not obvious solution for the given reaction systems due to applied reaction conditions, a high reactivity of PF$_3$ as well as rich platinum coordination and catalytic chemistry in the organic solvents, and could even be argued against.

The addition of the solvent in the solid-gas Pt(Hal)$_2$-M-PF$_3$ synthesis system solves the problems of the low, moderate and irreproducible yield in the solid-gas reactions (see the comparative Example 1 below) and a high pressure of PF$_3$ (50-150 Atm) required for synthesis of Pt(PF$_3$)$_4$. The addition of the solvent allows a synthesis of Pt(PF$_3$)$_4$ under a low PF$_3$ pressure, in a shorter time, with the reproducible high yield, see Examples 2 to 4 that follow. The reason for the yield improvement is solubility of the reaction intermediate PtCl$_2$(PF$_3$)$_2$ obtained in situ from PtCl$_2$ and PF$_3$ under certain reaction conditions (FIG. 3). Once more, it is known that solution-solid reactions are much more efficient than the reaction between two different solids and gas. In the Examples 2 to 4 that follow, the addition of the solvent in the PtCl$_2$—Cu—PF$_3$ synthesis system allowed synthesis of Pt(PF$_3$)$_4$ under a 10 to 50 psig of PF$_3$ pressure, in a 5 to 6 hours with a reproducible high yield (also see Example 1) because a solid-gas, PtCl$_2$—Cu—PF$_3$ synthesis system, becomes a solution-solid reaction. As a result, commonly available equipment and reactors could be utilized for the disclosed synthesis processes of Pt(PF$_3$)$_4$.

Suitable solvents should be "inert" toward starting compounds and intermediates and product Pt(PF$_3$)$_4$ and not react with the starting compounds and the intermediates and the product Pt(PF$_3$)$_4$ under the reaction conditions. In other words, the suitable solvents should not be catalytically transformed by the starting compounds, intermediates and product Pt(PF$_3$)$_4$ under the reaction conditions and the solvent should not transform starting compounds and products in to other compounds. The suitable solvent should only dissolve at least one intermediate in the reaction to get the solution-solid reaction, which is much more efficient, reproducible and therefore scalable than the reaction between two different solids and gas. The suitable solvents should be able to dissolve at least one platinum containing reaction intermediate such as Pt(Hal)$_2$(PF$_3$)$_x$, wherein Hal=F, Cl, Br or I; x=1, 2, obtained in situ from Pt(Hal)$_2$ and PF$_3$ under the reaction conditions.

The platinum precursor may form the soluble reaction intermediate in the solvent under certain reaction conditions, otherwise addition of solvent will result in a lower yield of Pt(PF$_3$)$_4$ compared to the reaction without the solvent, see the Comparative Example 1 (b)), where the yield of Pt(PF$_3$)$_4$ is 60% in a solid-gas reaction and Example 7 (#9), where the yield of Pt(PF$_3$)$_4$ is 26% for the reaction in hexadecane under the same pressure and temperature. The disclosed platinum precursor Pt(Hal)$_2$ (Hal=F, Cl, Br or I) are forming soluble intermediates and hence they are suitable for the disclosed synthesis process.

The suitable solvents used herein may be selected from ether, arene or alkane solvents. The preferred boiling point (BP) of the solvent may be more than 150° C., preferably more than 200° C. This is necessary for an efficient separation of the solvent and the product Pt(PF$_3$)$_4$ since the calculated boiling point of Pt(PF$_3$)$_4$ is ~77° C. calculated from the equation logP=10.34-2610/T (P in Torr, T in Kelvin) from "Vapor Pressure Measurements of Volatile Transition-Metal Complexes", by R. D. Sanner, J. H. Satcher, Jr., Report (1989), UCRL-53937. For example, hexadecane (BP: 285° C., melting point (MP): 18° C. and vapor pressure (VP): 0.07 Torr at 20° C.), p-cymene (BP: 177° C., MP: −68° C. and VP: 1 Torr at 20° C.) and dihexyl ether (BP: 223° C., MP: −43° C. and VP: 0.05 Torr at 20° C.), triethylene glycol dimethyl ether (BP: 216° C., MP: −45° C. and VP: 0.025 Torr at 20° C.), tetraethylene glycol dimethyl ether (BP: 275° C., MP: −30° C. and VP: 0.001 Torr at 20° C.) may be suitable for using as a solvent in the disclosed Pt(Hal)$_2$-M-PF$_3$ synthesis system.

In one embodiment, the intermediate PtCl$_2$(PF$_3$)$_2$ was isolated from the reaction of PtCl$_2$ and PF$_3$ in hexadecane, identity confirmed by analysis. PtCl$_2$(PF$_3$)$_2$ further reacted with copper and PF$_3$ under the conditions disclosed in #5 in Table 1 producing Pt(PF$_3$)$_4$.

Anhydrous solvents have to be applied for synthesis of Pt(PF$_3$)$_4$ because PF$_3$, PtCl$_2$, PtCl$_2$(PF$_3$)$_x$ (x=1, 2) and Pt(PF$_3$)$_4$ react with moisture. The reactions with moisture result in side products such as HCl, HF, and/or phosphorus oxofluorides, fluorophosphoric acids, which contaminate the product Pt(PF$_3$)$_4$. For example, HF may form SiF$_4$ when Pt(PF$_3$)$_4$ is placed in any vessels made from glass. To prevent the formation of contaminants, the commercially available solvent may be dried by contacting with the drying agent.

FIG. 2a is a flowchart of the disclosed Pt(Hal)$_2$-M-PF$_3$ synthesis process for synthesis of Pt(PF$_3$)$_4$ starting with Pt(Hal)$_2$ (Hal=F, Cl, Br or I). Starting materials include Pt(Hal)$_2$ (Hal=F, Cl, Br or I) and metal powder (M) and PF$_3$. In a reaction temperature ranging from 20-180° C., Pt(Hal)$_2$ (Hal=F, Cl, Br or I) and the metal powder may not be soluble. For example, PtCl$_2$ is not soluble at a reaction temperature ranging from 20-180° C. First, at step 202, a suspension of the starting materials Pt(Hal)$_2$ (Hal=F, Cl, Br or I) and a metal powder is formed in an anhydrous solvent by dispersing Pt(Hal)$_2$ (Hal=F, Cl, Br or I) and the metal powder to the anhydrous solvent. Afterward, excess PF$_3$ gas is introduced into the suspension of Pt(Hal)$_2$ (Hal=F, Cl, Br or I) and the metal powder. Here, preferably, Hal=Cl, then Pt(Hal)$_2$ is PtCl$_2$. Preferably, the metal powder is a Cu powder.

Pt(Hal)$_2$ (Hal=F, Cl, Br or I) is anhydrous and suspended in the anhydrous solvent. A solvent is dried by a drying agent to form the anhydrous solvent that is used to mix with the starting materials anhydrous Pt(Hal)$_2$ and metal powder. The solvent or anhydrous solvent may be a hydrocarbon solvent, such as an oxyhydrocarbon solvent, having a general formula (C$_n$H$_{2n+1}$)$_2$O and H$_3$C(O(CH$_2$)$_2$)$_n$OCH$_3$ (n≥1), an arene solvent having a general formula (C$_n$H$_{2n+1}$)$_x$C$_6$H$_{6-x}$ (x≥1, n≥1) or an alkane solvent having a general formula C$_n$H$_{2n+2}$ (n≥1). The anhydrous solvent suitable for using in the disclosed methods may be a dried alkane solvent selected from decane, di-, tri-, tetra, penta- and hexadecane, the like; a dried arene solvent selected from xylene, mesithylene, cymene, pentylbenzene, diisopropylbenzene, diisobutylbenzene, or the like; a dried ether solvent selected from dibutyl ether, dihexyl ether, dioctyl ether, dimethyl ether of diethylene glycol, triethylene glycol dimethyl ether, tetraethylene glycol dimethyl ether or the like; or an arene solvent selected from xylene, mesithylene, cymene, pentylbenzene, diisopropylbenzene, diisobutylbenzene or the like; or combinations thereof. The ether solvent is preferably dibutyl ether, dihexyl ether, dioctyl ether, triethylene glycol dimethyl ether, tetraethylene glycol dimethyl ether. The arene solvent is preferably xylene, mesithylene, cymene, pentylbenzene, diisopropylbenzene, diisobutylbenzene. The alkane solvent is preferably di-, tri-, tetra, penta- and hexadecane as well as a mixture of alkanes known as a mineral oil. The anhydrous solvent used in the disclosed methods may be xylene or hexadecane.

In some embodiments, the solvent or anhydrous solvent may be xylene or hexadecane. The drying agent may be 3 Å or 4 Å molecular sieves. $Pt(Hal)_2$ (Hal=F, Cl, Br or I), the metal powder and excess $PF_3$ in the anhydrous solvent may form a soluble reaction intermediate $Pt(Hal)_2(PF_3)_x$ (x=1, 2; Hal=F, Cl, Br or I) at step 204. The solvent or the anhydrous solvent used herein has to be able to dissolve $Pt(Hal)_2(PF_3)_x$ (x=1, 2; Hal=F, Cl, Br or I), a soluble reaction intermediate. Here excess $PF_3$ may be added into the suspension of $Pt(Hal)_2$ (Hal=F, Cl, Br or I) and the metal powder. Thus, the soluble reaction intermediate $Pt(Hal)_2(PF_3)_x$ (x=1, 2; Hal=F, Cl, Br or I) may be formed from $Pt(Hal)_2$ (Hal=F, Cl, Br or I) and excess $PF_3$ at a temperature, for example, between 80° C. to 130° C. and a low pressure, for example, between 20 psig to 300 psig. $Pt(Hal)_2$ (Hal=F, Cl, Br or I) reacts with excess $PF_3$ may produce a solution of the reaction intermediate $Pt(Hal)_2(PF_3)_x$ (x=1, 2; Hal=F, Cl, Br or I) in the anhydrous solvent since the solvent is selected to be able to dissolve the intermediate $Pt(Hal)_2(PF_3)_x$ (x=1, 2; Hal=F, Cl, Br or I). At step 206, the solution of the reaction intermediate $Pt(Hal)_2(PF_3)_x$ (x=1, 2; Hal=F, Cl, Br or I) may react with the metal powder and $PF_3$ gas (e.g., when Hal=Cl, the metal powder is a Cu powder, $PtCl_2(PF_3)_2 + 2Cu + 3PF_3 = 2CuCl + Pt(PF_3)_4$) to form $Pt(PF_3)_4$. At this step, excess of $PF_3$ is used. Then, at step 208, the produced $Pt(PF_3)_4$ is separated and purified from unreacted starting materials, the solvent and reaction byproducts such as copper halides (e.g., CuCl, $CuCl_2$) and their complexes with $PF_3$. The separation and purification steps may be performed in a pre-vacuumed trap and/or a metal trap to remove residual $PF_3$ and the solvent and the reaction byproducts, as shown in FIG. 1. The residual $PF_3$ may be recycled to be used as the starting material. The metal traps may be made of a metal, such as stainless steel, carbon steel, and stainless steel 316 alloy. The purified product $Pt(PF_3)_4$ is then stored in a metal ampoule or vessel or container at step 210. The storage metal ampoule or vessel or container may be made of a metal, such as stainless steel, carbon steel, and stainless steel 316 alloy. Alternatively, the storage ampoule or vessel or container may be made of plastic. The inner surface of the ampoule or vessel or container may be passivated with $PF_3$ or electro-polished.

In the disclosed methods, the anhydrous solvents have to be applied for synthesis of $Pt(PF_3)_4$ because $PF_3$, $PtCl_2$, $PtCl_2(PF_3)_x$ (x=1, 2) and $Pt(PF_3)_4$ react with moisture. To prevent the formation of contaminants, the commercially available solvent may be dried by contacting with the drying agent selected from 3 Å or 4 Å molecular sieves or activated alumina. Solvent drying processes may be achieved by contacting the solvent and the drying agent, which may be achieved in a static process or in a flow process. Before the drying step, the commercially available solvent may be degassed by passing an inert gas or by applying vacuum-inert gas cycles, where the vacuum is in the range 0.1 Torr to 100 Torr, preferably 0.5-10 Torr and the inert gas is selected from $N_2$, Ar or He containing less than 1 ppm of oxygen and moisture. Alternatively, the commercially available solvent dried with the drying agent without degassing.

The disclosed synthesis methods provide practical/scalable synthesis methods of $Pt(PF_3)_4$, through tuning and optimizing reaction conditions that favor the product $Pt(PF_3)_4$ in a high yield and minimize effects of side reactions. The disclosed synthesis methods may be carried out in a standard high pressure reactor, e.g., reactors from Parr Instrument Company Series 4520, 4530, 4540, 4540 rated from 1900 to 5000 psig; in pressure rated glass reactors, e.g., in Series 5100 Glass Reactors from Parr Instrument Company rated up to 150 psig; or in lab and pilot pressure reactors from Buchiglas and equipped with standard stirrers and heaters.

In some embodiments, the disclosed synthesis methods for synthesis, purification and storage of $Pt(PF_3)_4$ may comprise the following steps:
  a) drying a solvent;
  b) dispersing a platinum compound having a general formula $Pt(Hal)_2$ (Hal=Cl, Br, I), such as $PtCl_2$, and a metallic powder having certain particle sizes such as a metallic copper powder, into the dried or anhydrate solvent in a flow reactor, forming a mixture or a suspension of $Pt(Hal)_2$ (Hal=Cl, Br, I) and the metallic copper powder;
  c) adding excess amount of $PF_3$ to the mixture or the suspension;
  d) stirring a reaction mixture formed in the step c) under a required temperature and a required $PF_3$ pressure (i.e., low $PF_3$ pressure) that lead to the following reactions and products:
    a. formation of $PtCl_2(PF_3)_x$ (x=1, 2);
    b. solution of $PtCl_2(PF_3)_x$ in the dried solvent; and
    c. reaction of $PtCl_2(PF_3)_x$ and $PF_3$ with the metallic copper powder to form a product $Pt(PF_3)_4$;
  e) purifying the product $Pt(PF_3)_4$ through distilling volatile species from the reaction mixture into a separate trap that allows:
    i. separating unreacted starting material(s), byproducts, solvent; and
    ii. separating of the product $Pt(PF_3)_4$ from unreacted $PF_3$.
  f) purifying the crude $Pt(PF_3)_4$ by distillation;
  g) recycling the unreacted $PF_3$ to the step c); and
  h) storing the purified product $Pt(PF_3)_4$ in a metal ampoule or container made of a metal, such as stainless steel, carbon steel, and stainless steel 316 alloy and the inner surface of the metal ampoule or container is passivated by $PF_3$ or electro-polished.

Alternatively, the disclosed methods for synthesizing $Pt(PF_3)_4$ with a platinum compound $Pt(Hal)_2$, wherein Hal=F, Cl, Br or I comprise the following steps:
  dispersing the platinum compound $Pt(Hal)_2$, wherein Hal=F, Cl, Br or I into an anhydrous solvent forming a suspension of $Pt(Hal)_2$;
  introducing excess amount of $PF_3$ into the suspension of $Pt(Hal)_2$;
  forming a solution of the platinum compound $Pt(Hal)_2(PF_3)_x$ in the anhydrous solvent therefrom through a reaction of $PF_3$ and $Pt(Hal)_2$;
  adding a metal powder having certain particle sizes and additional excess amount of $PF_3$ into the $Pt(Hal)_2(PF_3)_x$ solution; and
  forming $Pt(PF_3)_4$ through a reaction between $Pt(Hal)_2(PF_3)_x$, $PF_3$ and the metal powder under a reaction condition.

In this case, $Pt(Hal)_2(PF_3)_x$ is a reaction intermediate synthesized by excess amount of $PF_3$ with the suspension of $Pt(Hal)_2$ in an anhydrous solvent. Once again, using solvent for the synthesis of $Pt(PF_3)_4$ appears novel. To our best knowledge, $Pt(PF_3)_4$ was never synthesized from any platinum compound including the reaction intermediate $Pt(Hal)_2(PF_3)_x$ (Hal=F, Cl, Br or I; x=1, 2) in a solvent.

Alternatively, the disclosed methods for synthesizing $Pt(PF_3)_4$ with a platinum compound $Pt(Hal)_2$, wherein Hal=F, Cl, Br or I, comprise the following steps:

providing a metal powder having certain particle sizes; providing $PF_3$ gas;

synthesizing $Pt(PF_3)_4$ from the metal powder, $PF_3$ and the platinum compound $Pt(Hal)_2$, wherein Hal=F, Cl, Br or I, in an anhydrous solvent capable of dissolving at least one platinum containing reaction intermediate $Pt(Hal)_2(PF_3)_x$ (Hal=F, Cl, Br or I; x=1, 2), which is formed from the platinum precursor $Pt(Hal)_2$ and $PF_3$ under reaction conditions, such as a low pressure from 20 psig to 300 psig and a temperature ranging from 80° C. to 130° C.; and purifying and storing $Pt(PF_3)_4$ at an air and moisture free condition in apparatus and ampoules fabricated from metal or plastic.

Alternatively, the disclosed method for synthesis of $Pt(PF_3)_4$ with a platinum compound $Pt(Hal)_2$, wherein Hal=F, Cl, Br or I comprises the following steps:

a) drying a solvent with a drying agent to form an anhydrous solvent;

b) adding a metal powder having certain particle sizes, a platinum compound having a general formula $Pt(Hal)_2$, wherein Hal=F, Cl, Br or I, and excess amount of $PF_3$ to the anhydrous solvent to form $Pt(Hal)_2(PF_3)_x$, where x=1, 2, wherein the anhydrous solvent is capable of dissolving $Pt(Hal)_2(PF_3)_x$;

c) synthesizing $Pt(PF_3)_4$ by the reaction of the metal powder, $PF_3$, and $Pt(Hal)_2(PF_3)_x$ in the anhydrous solvent; and d) purifying the synthesized $Pt(PF_3)_4$ and storing the purified $Pt(PF_3)_4$ under air and moisture free conditions in apparatus and ampoules fabricated from metal or plastic, such as stainless steel or plastic.

Here the plastic may be selected from polyethylene, polypropylene, styrene, teflon, polytetrafluoroethylene (PTFE), perfluoroalkoxy alkane(PFA).

Figure 2B:
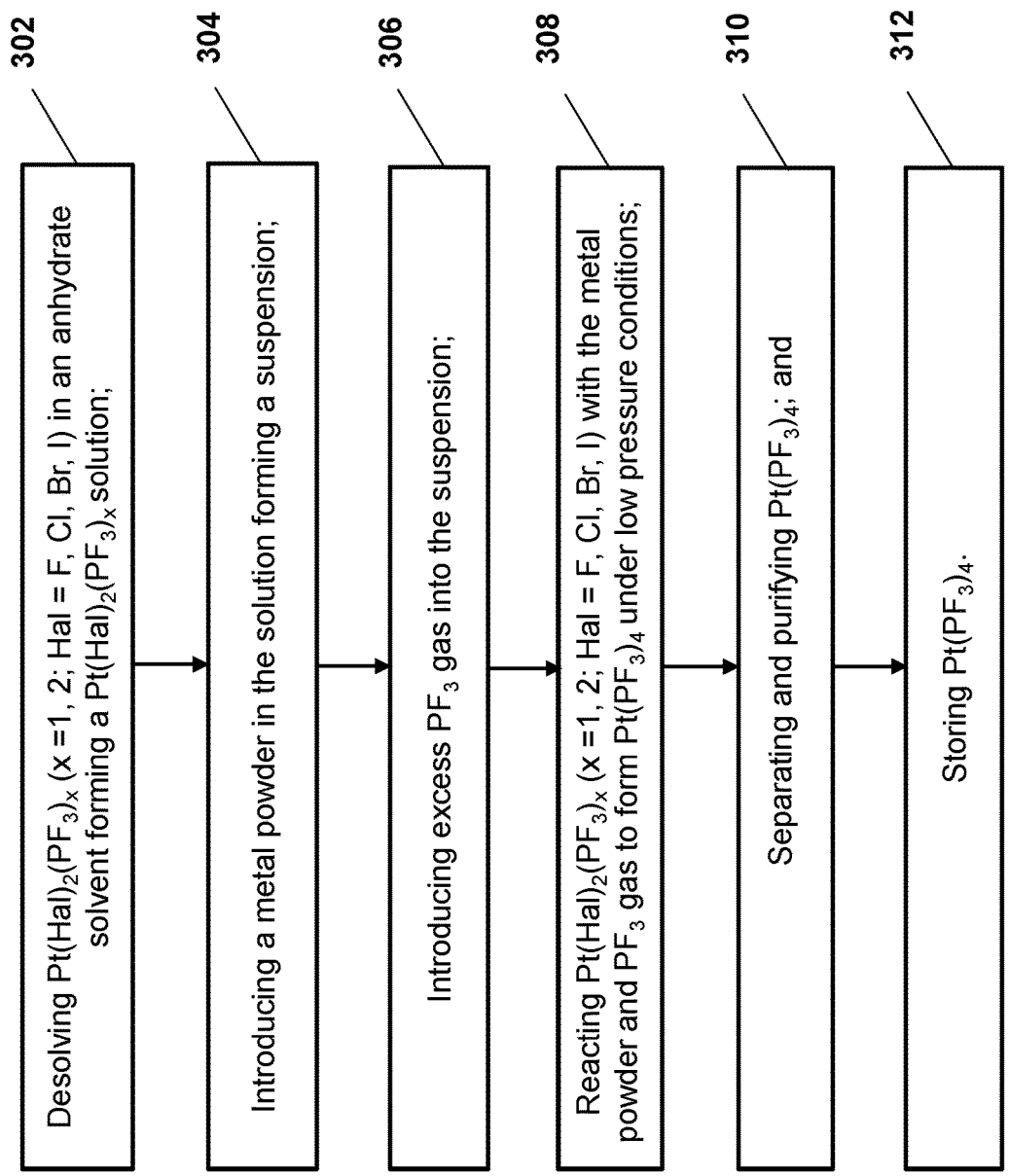
FIG. 2b is a flowchart of an exemplary disclosed process of synthesizing $Pt(PF_3)_4$ starting with $Pt(Hal)_2(PF_3)_x$ (x=1, 2; Hal=F, Cl, Br or I)

As describe above, the reaction intermediates $Pt(Hal)_2(PF_3)_x$ (Hal=F, Cl, Br or I; x=1, 2) are soluble in hydrocarbon solvents and can be isolated and purified. Synthesis of $Pt(PF_3)_4$ may be start with the platinum compound $Pt(Hal)_2(PF_3)_x$ (Hal=F, Cl, Br or I; x=1, 2). FIG. 2b is a flowchart of an exemplary process of synthesizing $Pt(PF_3)_4$ starting with $Pt(Hal)_2(PF_3)_x$ (x=1, 2; Hal=F, Cl, Br or I). As shown, at step 302, a $Pt(Hal)_2(PF_3)_x$ (Hal=F, Cl, Br or I; x=1, 2) solution is formed by dissolving $Pt(Hal)_2(PF_3)_x$ (Hal=F, Cl, Br or I; x=1, 2) into an anhydrate solvent. Preferably, Hal is Cl, $Pt(Hal)_2(PF_3)_x$ is $PtCl_2(PF)_x$. Then at step 304, a metal powder having certain particle sizes is introduced into the $Pt(Hal)_2(PF_3)_x$(Hal=F, Cl, Br or I; x=1, 2) solution and forms a suspension. Preferably, the metal powder is a Cu powder having certain particle sizes. Afterwards, excess $PF_3$ gas is introduced into the suspension at step 306. Then, $Pt(PF_3)_4$ is formed under low pressure by reacting $Pt(Hal)_2(PF_3)_x$ (x=1, 2; Hal=F, Cl, Br or I) with the metal powder and $PF_3$ at step 308. At this step, excess of $PF_3$ is used. Then, at step 310, the produced $Pt(PF_3)_4$ is separated and purified from unreacted starting materials, the solvent and reaction byproducts such as copper halides (e.g., CuCl, $CuCl_2$) and their complexes with $PF_3$. The separation and purification steps may be performed in a pre-vacuumed trap and/or a metal trap to remove residual $PF_3$ and the solvent and the reaction byproducts, as shown in FIG. 1. The residual $PF_3$ may be recycled to be used as the starting material. The metal traps may be made of a metal, such as stainless steel, carbon steel, and stainless steel 316 alloy. The purified product $Pt(PF_3)_4$ is then stored in a metal ampoule or vessel or container at step 312. The storage metal ampoule or vessel or container may be made of a metal, such as stainless steel, carbon steel, and stainless steel 316 alloy. Alternatively, the storage ampoule or vessel or container may be made of plastic. The inner surface of the ampoule or vessel or container may be passivated with $PF_3$ or electro-polished.

The disclosed methods for synthesizing $Pt(PF_3)_4$ with a platinum compound $Pt(Hal)_2(PF_3)_x$, wherein Hal=F, Cl, Br or I; x=1, 2, comprise the following steps:

dissolving $Pt(Hal)_2(PF_3)_x$ (Hal=F, Cl, Br or I; x=1, 2) in an anhydrous solvent forming a $Pt(Hal)_2(PF_3)_x$ solution;

adding a metal powder having certain particle sizes and excess amount of $PF_3$ into the $Pt(Hal)_2(PF_3)_x$ solution; and forming $Pt(PF_3)_4$ through a reaction between $Pt(Hal)_2(PF_3)_x$, $PF_3$ and metal powder under a reaction condition of a low pressure ranging from 20 psig to 300 psig and a temperature ranging from 80° C. to 130° C.

Alternatively, the disclosed methods for synthesizing $Pt(PF_3)_4$ with a platinum compound $Pt(Hal)_2(PF_3)_x$, wherein Hal=F, Cl, Br or I; x=1, 2, comprise the following steps:

a) drying a solvent with a drying agent to form an anhydrous solvent;

b) adding the platinum compound $Pt(Hal)_2(PF_3)_x$, wherein Hal=F, Cl, Br or I; x=1, 2, a metal powder having certain particle sizes and excess amount of $PF_3$ to the anhydrous solvent to synthesize $Pt(PF_3)_4$, wherein the anhydrous solvent is capable of dissolving $Pt(Hal)_2(PF_3)_x$; and c) purifying the synthesized $Pt(PF_3)_4$ and storing the purified $Pt(PF_3)_4$ under air and moisture free conditions in apparatus and ampoules fabricated from metal or plastic, such as stainless steel.

Here the plastic may be selected from polyethylene, polypropylene, styrene, teflon, polytetrafluoroethylene (PTFE), perfluoroalkoxy alkane(PFA). The metal may be selected from selected from carbon steel, stainless steel, or stainless steel 316 alloy. The metal powder may be a Cu, Zn or Al powder, or the like.

The disclosed also include the purity of the product $Pt(PF_3)_4$ and storage vessels for the product $Pt(PF_3)_4$. The product $Pt(PF_3)_4$ may be stored in stainless steel and electropolished stainless steel vessels at room temperature without changing of purity. The disclosed methods for synthesis of $Pt(PF_3)_4$ further comprise the steps of purifying the synthesized $Pt(PF_3)_4$:

distilling the synthesized $Pt(PF_3)_4$ in a metal trap to remove the solvent and byproducts, forming a by-product removal $Pt(PF_3)_4$;

distilling the by-product removal $Pt(PF_3)_4$ in a metal vessel to remove the solvent and residual $PF_3$, forming a purified $Pt(PF_3)_4$; and optionally, recycling the residual $PF_3$ for synthesizing $Pt(PF_3)_4$.

The disclosed methods for synthesizing $Pt(PF_3)_4$ further comprise the steps of storing the purified $Pt(PF_3)_4$:

storing the purified $Pt(PF_3)_4$ in a metal (e.g., stainless steel) vessel or an inner surface passivated or electro-polished metal (e.g., stainless steel) vessel at room temperature.

Here, the purity of the purified $Pt(PF_3)_4$ stored in the metal vessels or an inner surface passivated or electro-polished metal vessels may not change and remains constant. The vessel fabricated from carbon steel, stainless steel, and stainless steel 316 alloy. The metal vessel may have electro-polished inner surface. Alternatively, $Pt(PF_3)_4$ may be stored in a plastic vessel. The plastic material may be polyethylene, polypropylene, styrene, teflon, polytetrafluoroethylene (PTFE), perfluoroalkoxy alkane(PFA).

The metal powder used in the disclosed methods consists of a metal having an electrode potential lower than that of platinum, not interacting with $PF_3$ and not forming complexes with $PF_3$ under the reaction conditions and having a proper particle size range allowing it to stay in a powder form during the reaction process.

The metal powder preferably is a copper, zinc, aluminum powder, or the like. Any metal and its halide not interacting with $PF_3$ and not forming complexes with $PF_3$ under the reaction conditions and having the electrode potential lower than that of platinum (+1.2) may be used herein. For example, Cu (+0.34), Pb (−0.13), Sn (−0.14), Cd (−0.40), Zn (−0.76) and their halides do not interact with $PF_3$ under the reaction conditions and do not form complexes with $PF_3$, which may be used as the metal powder.

EXAMPLES

The following non-limiting examples are provided to further illustrate embodiments of the invention. However, the examples are not intended to be all-inclusive and are not intended to limit the scope of the inventions described herein.

Experimental Procedures

Reaction mixtures, starting materials, solvents and products may be analyzed by any suitable means, such as by gas chromatography, NMR, Raman, FTIR spectroscopy using part of the stream or aliquots. All measurements were performed for samples in the closed containers, suitable tubes, or ampoules without any contact with atmosphere containing oxygen and moisture. Liquid nitrogen, nitrogen gas of high purity with less than 0.1 ppm of $O_2$ and water.

Reagents: Potassium Hexachloroplatinate (IV) ($K_2PtCl_6$, Pt Assay 40.1±0.7%, CAS: 16921-30-5) was from Colonial Metals, Inc.; Platinum(II) chloride ($PtCl_2$, Pt Assay 73.3±1.0%, CAS: 10025-65-7) was from Colonial Metals, Inc. Three types of copper powder, one was (99.999%) 100 mesh (100 mesh=149 μm) from Strem Chemicals Inc.; another one was <425 μm, 99.5% from Sigma-Aldrich; another one was <45 μm, 99.99% from Sigma-Aldrich.

Phosphorus(III) fluoride ($PF_3$, CAS: 7783-55-3) was from Advance Research Chemicals, Inc. Molecular sieves, 3 Å, beads, 4-8 mesh (Sigma-Aldrich), were regenerated either in dry nitrogen stream at temperatures 300-350° C. or under vacuum at temperatures 300-350° C. and operated under nitrogen atmosphere with less than 0.5 ppm of $O_2$ and moisture after regeneration. Solvents xylenes and hexadecane were from Sigma-Aldrich degassed and dried over 3 Å molecular sieves. The reactor was loaded with platinum compound and copper powders under nitrogen atmosphere with less than 0.5 ppm of $O_2$ and water.

Example 1. Synthesis of $Pt(PF_3)_4$ in High Pressure Reactor with Hexadecane Solvent Referring to Table 1 below, amounts of $PtCl_2$, Cu, hexadecane are loaded in a reactor from Parr Instrument Company (Series 4540, 600 mL rated for 5000 psig) in a glove box. The reactor transferred and connected to the vacuum line, vacuumed below 0.3 Torr and the required amount of $PF_3$ introduced in the reactor below −79° C. (#1-3) or at room temperature (#6). Then the reactor warmed to room temperature, stirring started, and then the temperature in reactor increased to 105° C. and the reaction mixture stirred under $PF_3$ pressure. In reaction #6, $PF_3$ is added in the reactor by portions during the reaction to maintain pressure in the range 100-200 psig. The pressure decrease observed in all reactions during the first 6 hours at 105° C. and then the pressure stabilized indicating that the reaction may take approximately 6 hours. The pressure in reactor monitored during several more hours, then the reactor content cooled to 35-45° C. and the portion of gases (about 25-35%) directed in pre vacuumed trap (0.44 L, material stainless steel) cooled with the dry ice—isopropanol mixture. In reaction #6, all pressure released in the trap. The reactor closed, trap kept for about 10 min and then the non-condensable gas directed in the second trap cooled with liquid nitrogen (6 L, material Aluminum). Transfer lines and valves were warmed if cooled below 0° C. with the passing gas. After condensation of $PF_3$ portion in 6 L Al trap, vacuum applied to 6 L Al trap to get the pressure in trap below 1 Torr. Operation repeated until all $PF_3$ and $Pt(PF_3)_4$ were stripped from the reactor and collected in two different traps. Then the trap with $Pt(PF_3)_4$ was reconnected to a separate pre-vacuumed vessel (0.4 L, electropolished stainless steel). The parent trap with $Pt(PF_3)_4$ warmed to room temperature, while a receiving vessel cooled with liquid nitrogen and all $Pt(PF_3)_4$ distilled in the receiving vessel under a static vacuum. After distillation, the receiving vessel warmed to room temperature and the residual $PF_3$ released through the scrubber. Yield of $Pt(PF_3)_4$ is in Table 1 below.

TABLE 1

| # | $PtCl_2$ (g) | Solvent | (mL) | $PF_3$ (psig) at 105° C. | Yield of $Pt(PF_3)_4$ (%, g) | Reactor |
|---|---|---|---|---|---|---|
| 1 | 25.7 | Hexadecane | 100 | 2250-2350 | 93% (49.3 g) | SS Steel |
| 2 | 40.3 | Hexadecane | 150 | 2150-2350 | 88% (73.5 g) | SS Steel |
| 3 | 51.0 | Hexadecane | 129 | 2300-2500 | 86% (90.0 g) | SS Steel |
| 4 | 8.75 | Hexadecane | 40 | 20-50 | 79% (14.3 g) | Glass |
| 5 | 2.19 | Xylene | 18.5 | 20-40 | 95% (4.3 g) | Glass |
| 6* | 50 | Hexadecane | 200 | 100-200 | 90% (94 g) | SS Steel |

*Reaction 6 is prophetic.
SS Steel reactor = high pressure reactor from Parr Instrument Company (Series 4540, 600 mL).
Glass reactor = 150 mL HW Pressure Glass Vessel from Chemglass Life Sciences, part number CG-1880-31.
The glass vessel is equipped with the thermocouple and pressure gauge.

Purity of $Pt(PF_3)_4$ is more than 99% in all experiments according to $^1H$, $^{19}F$ NMR. For example, reaction #1, $^{19}F$ NMR of neat product (σ $CFCl_3$, ppm): −11.5 (m, J(P-F)= 1302 Hz, 99.63%, $Pt(PF_3)_4$), −34.4 (d, J(P-F)=1402 Hz, 0.05%, $PF_3$), −81.58 (0.19%, fluorophosphoric acid, not assigned), −92.4 (d, J(P-F)=2035 Hz, 0.12%, $POF_3$). $^1H$ NMR of neat product (σ $SiMe_4$, ppm): 0.90 and 1.32

(hexadecane), 13.1 (s, fluorophosphoric acid). Determination of hexadecane by $^1$H NMR. Taken 0.18 g of purified product from reaction #1 and mixed with in 0.77 g of $C_6D_6$ containing 0.03% (0.23 mg, 0.0026 mmol of SiMe$_4$). $^1$H NMR of solution (σ SiMe$_4$, ppm): 0.00 (s, 97.7 mol. %, SiMe$_4$), 1.32 (2.3 mol. %, hexadecane), 7.16 (s, fluorophosphoric acid, relative intensity not measured since $C_6D_6$ not dried from moisture). If to recalculate mol % to wt. %, and count that solution contains 0.23 mg TMS, then the total amount of hexadecane in Pt(PF$_3$)$_4$ sample is 0.014 mg corresponding to 79 ppm in Pt(PF$_3$)$_4$ from reaction #1.

Additional trap to trap distillation afford Pt(PF$_3$)$_4$ with purity 99.79%. $^{19}$F NMR of neat sample measured in glass ampoule (a CFCl$_3$, ppm): −11.5 (m, J(P-F)=1302 Hz, 99.79%, Pt(PF$_3$)$_4$), −88.20 (d, J(P-F)=975 Hz, 0.19%, (HO) POF$_2$), −92.4 (d, J(P-F)=2035 Hz, 0.01%, POF$_3$) −166.1 (s, 0.02%, SiF$_4$). $^1$H NMR of neat sample (σ SiMe$_4$, ppm): 0.90 and 1.32 (hexadecane, rel. int. 28%), 12.94 (s, (HO)POF$_2$, rel. int. 72%). The resonances of hexadecane were below the limit of detection for solution of 0.07 g of sample in 0.78 g of $C_6D_6$ containing 0.03% of SiMe$_4$. Hence the total amount of hexadecane is less than 80 ppm. FTIR. [liquid Pt(PF$_3$)$_4$ on Golden Gate™ probe, resolution 4 cm$^{-1}$]: 882, 827, 496 cm$^{-1}$.

Example 2. Synthesis of Pt(PF$_3$)$_4$ with Isolation of PtCl$_2$(PF$_3$)$_2$ and Hexadecane Solvent a) Synthesis of PtCl$_2$(PF$_3$)$_x$ (x=1, 2) in Hexadecane.

PtCl$_2$ (1.9 g, 7.1 mmol), hexadecane (15.8 g, 20.4 mL) loaded in the 150 mL pressure glass ampoule (Chemglass Life Sciences, part number CG-1880-31) equipped with a stirring bar, thermocouple, pressure gauge. The ampoule connected to a vacuum line and cylinder with PF$_3$. The ampoule with the starting materials vacuumed to around 0.2 Torr to remove nitrogen, then 35 psig of PF$_3$ added and the suspension heated under stirring. The content stirred for 4 hours in the temperature range 100-120° C. under 20-35 psig of PF$_3$, where PF$_3$ added by portions when the pressure was approaching to 20 psig. During the reaction, initially insoluble in hexadecane PtCl$_2$ fully reacted with PF$_3$ and formed soluble in hexadecane compounds, which partially sublimed on the colder parts of apparatus as colorless crystals. After 4 hours, the heating stopped, reaction mixture cooled to room temperature, PF$_3$ condensed back in the cylinder and a portion of crystals separated from solution and analyzed; the portion of supernatant hexadecane solution also analyzed by $^{19}$F NMR. $^{19}$F NMR of crystals dissolved in pure, anhydrous hexadecane (σ CFCl$_3$, ppm): −36.4 (m, J(Pt-F)=628 Hz, J(P-F)=1320 Hz, PtCl$_2$(PF$_3$)$_2$). $^{19}$F NMR of hexadecane supernatant solution (σ CFCl$_3$, ppm): −32.5 (d, J(P-F)=1405 Hz, PF$_3$), −36.4 (m, J(Pt-F)= 622 Hz, J(P-F)=1318 Hz, PtCl$_2$(PF$_3$)$_2$). FTIR of crystals (neat solid on Golden Gate™ probe, resolution 4 cm$^{-1}$): 417 (sh, w), 447 (sh, w), 461 (m), 483 (s), 507 (s), 518 (s), 531 (m), 551 (s), 901 (vs), 907 (sh), 933 (vs), 961 (s), 969 (w), 974 (m), 985 (w) DSC of crystals: 19.0° C. (phase transition), 72.5° C. (phase transition), 118.3° C. (melting point).

b) Synthesis of Pt(PF$_3$)$_4$ from PtCl$_2$(PF$_3$)$_x$ (x=1, 2) in Hexadecane.

The colorless crystals from a) placed in a supernatant hexane solution, copper added (2.22 g, 34.9 mmol) and the ampoule (150 mL HW Pressure Glass Vessel) connected to a vacuum line and a cylinder with PF$_3$. The ampoule with the starting materials briefly vacuumed to about 2 Torr to remove nitrogen, then 40 psig of PF$_3$ added and the suspension heated in the temperature range 100-130° C. under stirring for 4 hours. The reaction is under 20-40 psig of PF$_3$, where PF$_3$ added by portions when the pressure was approaching to 20 psig. After 4 hours heating stopped, the reaction mixture cooled to 35° C. and Pt(PF$_3$)$_4$, PF$_3$, some solvent condensed in the trap (made from stainless steel) cooled with liquid nitrogen under the static vacuum. Pt(PF$_3$)$_4$ purified from PF$_3$ and residual hexadecane by trap to trap distillation. Yield of Pt(PF$_3$)$_4$ is 1.25 g (32%, low yield since part of PtCl$_2$(PF$_3$)$_2$ and supernatant solution used for analyses in a)). $^{19}$F NMR of neat product Pt(PF$_3$)$_4$ (σ CFCl$_3$, ppm): −11.5 (m, J(P-F)=1301 Hz, Pt(PF$_3$)$_4$). $^1$H NMR of neat product (σ SiMe$_4$, ppm): 0.23 (t, J=6.1 Hz, 71.7 mol. %, Me$_2$SiF$_2$), 0.90 and 1.32 (28.3 mol. %, hexadecane).

Example 3. Synthesis of Pt(PF$_3$)$_4$ in Glass Ampoule with Hexadecane Solvent

PtCl$_2$ (8.75 g, 32.9 mmol), Cu (18.25 g, 287.2 mmol), hexadecane (30.95 g, 40 mL) loaded in an ampoule (150 mL HW Pressure Glass Vessel from Chemglass Life Sciences, part number CG-1880-31) equipped with a stirring bar, thermocouple, pressure gauge. The ampoule connected to a vacuum line and cylinder with PF$_3$. The ampoule with the starting materials vacuumed to about 0.2 Torr to remove nitrogen, then 40 psig of PF$_3$ added and the content heated under stirring. The content stirred for 5.5 hours in the temperature range 110-120° C. under 20-50 psig of PF$_3$, where PF$_3$ added by portions when the pressure was approaching to 20 psig. During the reaction, crystals of PtCl$_2$(PF$_3$)$_2$ formed and then consumed and at the end of reaction the reaction mixture contained two non-miscible liquids. After 5 hours 30 min heating stopped, the reaction mixture cooled to 41° C. and Pt(PF$_3$)$_4$, PF$_3$, some solvent condensed in the trap (made from stainless steel) cooled with liquid nitrogen under the static vacuum. Pt(PF$_3$)$_4$ purified from PF$_3$ and residual hexadecane by trap to trap distillation. Yield of Pt(PF$_3$)$_4$ is 79% (14.2 g). $^{19}$F NMR of neat sample (σ CFCl$_3$, ppm): −11.5 (m, J(P-F)=1301 Hz, 99.40%, Pt(PF$_3$)$_4$), −34.4 (d, J(P-F)=1402 Hz, 0.36%, PF$_3$), −92.4 (d, J(P-F)=2035 Hz, 0.23%, POF$_3$), −166.0 (s, 0.007%, SiF$_4$). $^1$H NMR of neat sample (σ SiMe$_4$, ppm): 0.23 (t, J=6.1 Hz, 67.4 mol. %, Me$_2$SiF$_2$), 0.90 and 1.32 (6.9 mol. %, hexadecane), 1.45 (d, J=6.1 Hz, 25.8 mol. %, P(O$^i$Pr)$_3$). Determination of the organic content by $^1$H NMR. The intensities of the resonances of organic compounds were below the limit of detection for solution of 0.09 g of Pt(PF$_3$)$_4$ sample dissolved in 0.76 g of $C_6D_6$ containing 0.03% (0.228 mg, 0.0026 mmol of SiMe$_4$). Hence the total amount of organic compounds is less than 80 ppm in Pt(PF$_3$)$_4$.

Example 4. Synthesis of Pt(PF$_3$)$_4$ in Glass Ampoule Applying Xylene Solvent

PtCl$_2$ (2.19 g, 8.2 mmol), Cu (4.69 g, 73.8 mmol), xylenes (16.1 g) loaded in a 150 mL pressure glass ampoule (Chemglass Life Sciences, part number CG-1880-31) equipped with a stirring bar, thermocouple, pressure gauge. The ampoule connected to a vacuum line and a cylinder with PF$_3$. The ampoule with the starting materials briefly vacuumed to around 3 Torr to remove nitrogen, then 40 psig of PF$_3$ added and the content heated under stirring. The content stirred for 4.5 hours in the temperature range 100-120° C. under 20-40 psig of PF$_3$, where PF$_3$ added by portions when the pressure was approaching to 20 psig. During the reaction, crystals of PtCl$_2$(PF$_3$)$_2$ formed and then consumed and at the end of reaction the reaction mixture contained two non-miscible liquids. After 4 hours 30 min heating stopped, the reaction mixture cooled to 38° C. and $Pt(PF_3)_4$, $PF_3$, some solvent condensed in the trap (made from stainless steel) cooled with liquid nitrogen under the static vacuum. $Pt(PF_3)_4$ purified from $PF_3$ and residual solvent xylene by trap to trap distillation. Yield of $Pt(PF_3)_4$ is 95% (4.3 g). $^{19}F$ NMR of neat sample (σ $CFCl_3$, ppm): −11.5 (m, J(P-F)= 1301 Hz, 99.58%, $Pt(PF_3)_4$), −34.4 (d, J(P-F)=1402 Hz, 0.39%, $PF_3$), −92.4 (d, J(P-F)=2035 Hz, 0.03%, $POF_3$), −166.0 (s, 0.01%, $SiF_4$). % are from integration. $^1H$ NMR of neat sample (σ $SiMe_4$, ppm): 0.12 (t, J=6.1 Hz, 0.7 mol. %, $Me_2SiF_2$), 1.11 (t) and 2.56 (q) (18.8 mol %, Et-$CH_5$), 2.05 (s) and 2.14 (s) (79.4 mol. %, xylenes), 6.97 (m, aromatic protons), 12.46 (br, 1.0 mol. %, fluorophosphoric acid). Determination of the residual solvent by $^1H$ NMR. Taken 0.088 g of $Pt(PF_3)_4$ sample dissolved in 0.80 g of $C_6D_6$ containing 0.03% (0.24 mg, 0.0027 mmol of $SiMe_4$. $^1H$ NMR (σ $SiMe_4$, ppm): 0.00 (s, 6.28 mol. %, $SiMe_4$), 1.07 (t) and 2.39 (q) (18.64 mol %, Et-$CH_5$), 2.02 (s, 11.41 mol. %, xylene), 2.14 (s, 63.67 mol. %, xylene), 6.97 (m, aromatic protons). If to recalculate mol % to wt. %, and count that solution contains 0.24 mg TMS, then the total amount of organic compounds is 4.27 mg corresponding to 4.85 wt. % in 88 mg of $Pt(PF_3)_4$ sample.

Example 5. $Pt(PF_3)_4$ Shelf Life

A shelf life study was performed during 12 weeks at room temperature. $Pt(PF_3)_4$ obtained in syntheses described in examples 3 and 4 and was stored at room temperature in a 316 alloy Single-Ended Miniature Sample Cylinder, volume 50 $cm^3$ with the blind cap attached and in electro-polished Stainless-Steel Miniature Canister (V=400 $cm^3$) with the blind cap attached. Both containers were vacuum baked at approximately 150° C. and 30-50 mTorr before introducing $Pt(PF_3)_4$. $^{19}F$ and $^1H$ NMR spectra were measured for the neat liquid $Pt(PF_3)_4$ every 2 weeks, monitored $Pt(PF_3)_4$ assay and relative amount of impurities from $^{19}F$ and $^1H$ NMR spectra. The results of shelf life study are in Table 2.

TABLE 2

| Package (Room Temperature) | Material | $Pt(PF_3)_4$ load (g) | $Pt(PF_3)_4$ assay* | Impurities | Hexadecane |
|---|---|---|---|---|---|
| 50 mL | 316 SS | 45 | 99.74 ± 0.06% | 0.26 ± 0.06% | Not quantified (< 10 ppm) |
| 400 mL | Electro-polished SS | 160 | 99.77 ± 0.02% | 0.22 ± 0.03% | 9.6 ± 0.5 ppm |

*Starting amount on day 1.

Figure 4:
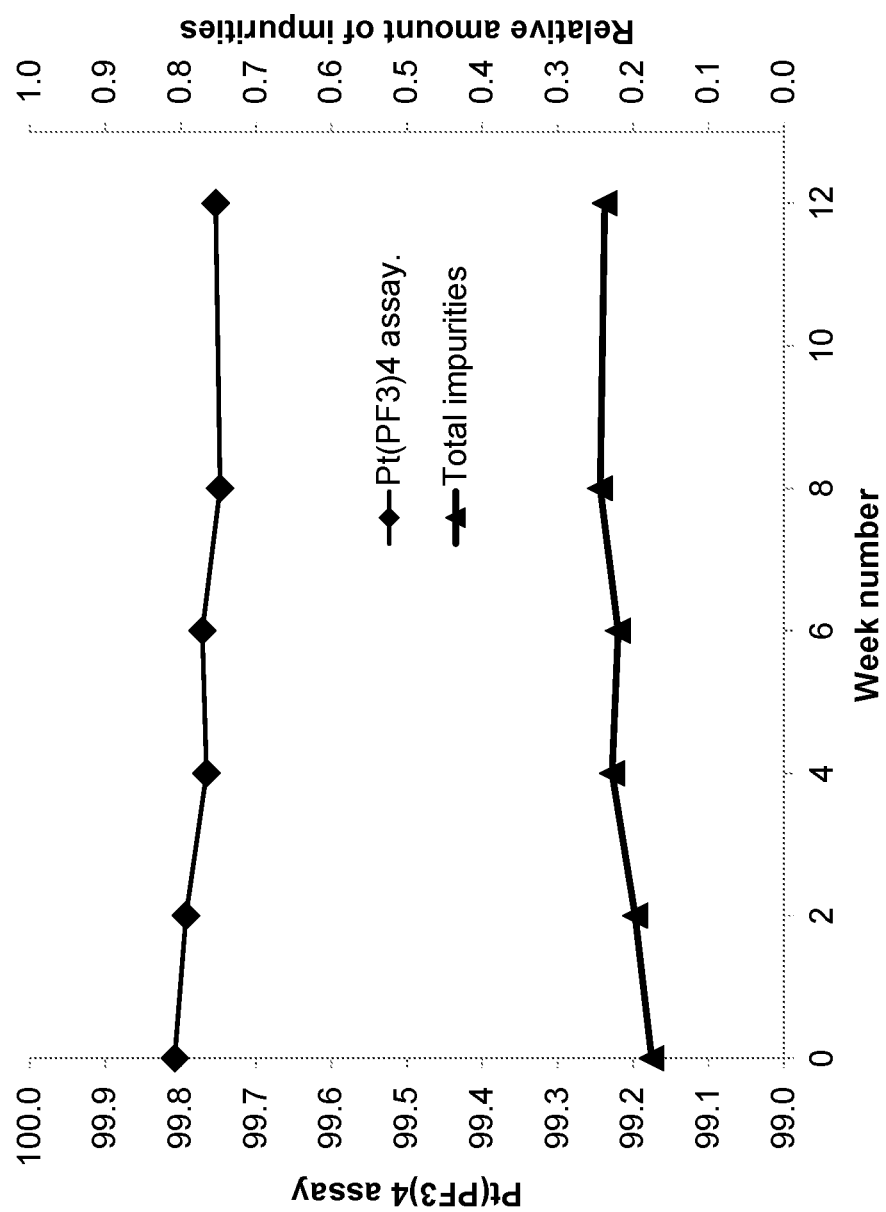
FIG. 4 is a graph for the $Pt(PF_3)_4$ assay and relative amount of impurities over time in an electro-polished stainless-steel miniature canister at room temperature.

$Pt(PF_3)_4$ assay and relative amount of impurities is nearly similar in all experiments within 12 weeks. The deviation is higher for 316 SS steel ampoule. These results demonstrate the stability of $Pt(PF_3)_4$ overtime. FIG. 4 is a graph for the $Pt(PF_3)_4$ assay and relative amount of impurities over time in a 400 mL electro-polished stainless-steel miniature canister at room temperature. The disclosed $Pt(PF_3)_4$ is aimed to use as a precursor for Pt-containing films in microelectronic devices or in catalyst industries.

Comparative Example 1. Synthesis of $Pt(PF_3)_4$ Starting from $K_2PtCl_6$ Using the Recipes from Angew. Chem. Int. Ed. 1965, 4, 521 and RU2478576C2

Syntheses of $Pt(PF_3)_4$ according to the recipes from Angew. Chem. Int. Ed. 1965, 4, 521 and RU2478576C2 are shown in Table 3 below. The experiments are conducted with a commercially available high pressure reactor from Parr Instrument Company (Series 4540, 600 mL rated for 5000 psig equipped with the standard impeller in experiments #10 and #12 and with the U-type anchor stirrer designed for an efficient stirring of solids in b). The process of RU2478576C2 utilizes pure hydrogen and a step of drying after reduction, which requires costly safety equipment and a long time, if removal of water from the system is ever possible by scaling. As shown in Table 3, #10 was done with the copper powder Cu of 149 μm size (copper powder packed by vendor under argon and utilized as). #11 and #12 were done with the copper powder Cu of 425 μm size (99.5% from Sigma-Aldrich). Synthesis of $Pt(PF_3)_4$ starting from $PtCl_2$ (#12, Table 3) performed according to [Angew. Chem. Int. Ed. 1965, 4, 521] was done with, where Cu prepared from Copper powder of <425 μm size (99.5% from Sigma-Aldrich). $Pt(PF_3)_4$ (in #10-12) is forming in low to moderate yields.

Referring to Table 3, comparative examples performed on commercially available standard equipment, amounts of the starting materials $K_2PtCl_6$, $PtCl_2$, Cu were loaded in a reactor in a glove box with <0.5 ppm of oxygen and moisture. The reactor sealed, connected to the vacuum line, vacuumed below 0.2 Torr, cooled below −79° C. and the required amount of $PF_3$ introduced in reactions #10 to #12 at low temperature with stirring. Then the reactor warmed to room temperature and further to 105-130° C. and the content stirred under $PF_3$ pressure for 24 hours. Then reactor content cooled to 35-45° C. and the portion of gases (about 25-35%) directed in pre vacuumed trap (0.44 L, material stainless steel) cooled with the dry ice—isopropanol mixture. The reactor closed, trap kept for about 10 min and then the non-condensable gas directed in the second trap cooled with liquid nitrogen (6 L, material Aluminum). Transfer lines and valves were warmed if cooled below 0° C. with the passing gas. After condensation of $PF_3$ portion in 6 L Al trap, vacuum applied to 6 L Al trap to get the pressure in trap below 1 Torr. Operation repeated until all $PF_3$ and $Pt(PF_3)_4$ were stripped from the reactor and collected in two different traps. Then the trap with $Pt(PF_3)_4$ was reconnected to a separate pre-vacuumed vessel (50 mL, stainless steel). The parent trap with $Pt(PF_3)_4$ warmed to room temperature, while a receiving vessel cooled with liquid nitrogen and all $Pt(PF_3)_4$ distilled in the receiving vessel under a static vacuum. After distillation, the receiving vessel warmed to room temperature and the residual $PF_3$ released through the scrubber. Yield of $Pt(PF_3)_4$ for each experiment shows a low to moderate yield, although RU2478576C2 claimed 60-95% yield. The low to moderate yield of $Pt(PF_3)_4$ obtained from RU2478576C2 recipe might be because of a lack of solvent. Purity of $Pt(PF_3)_4$ is more than 97.9% in all experiments according to $^1H$, $^{19}F$ NMR. As example, $^{19}F$ NMR of neat product from experiment b) (σ $CFCl_3$, ppm): −11.5 (m, J(P-F)=1302 Hz, 97.9%, $Pt(PF_3)_4$), −34.4 (d, J(P-F)=1402 Hz, 0.2%, $PF_3$), −92.4 (d, J(P-F)=2035 Hz, 2.0%, $POF_3$).

TABLE 3

| # | Pt reagent (g) | Cu powder size (μm) | $PF_3$ pressure (psig) | Yield of $Pt(PF_3)_4$ (%, g) | Observations |
|---|---|---|---|---|---|
| 10 | 29.3 [$K_2PtCl_6$] | 149 | 1552 | 1%, 0.5 g | Solid baked in one block, no stirring |

TABLE 3-continued

| # | Pt reagent (g) | Cu powder size (μm) | PF$_3$ pressure (psig) | Yield of Pt(PF$_3$)$_4$ (%, g) | Observations |
|---|---|---|---|---|---|
| 11 | 54.1 [K$_2$PtCl$_6$] | 425 | 2940 | 60%, 36.2 g | Anchor stirrer. K$_2$PtCl$_6$ partially sublimed on colder parts of reactor and did not react further. |
| 12 | 26.9 [PtCl$_2$] | 425 | 2350 | 20%, 11.1 g | Standard impeller. Poor mixing. |

Example 6. Synthesis of Pt(PF$_3$)$_4$ Starting from K$_2$PtCl$_6$ in High Pressure Reactor with Hexadecane Solvent K$_2$PtCl$_6$ (79.5 g, 0.16 mol), Cu (120.6 g, 1.9 mol), hexadecane (100 g) are loaded in a reactor (Parr Instrument Company, Series 4540, 600 mL rated for 5000 psig) in glove box. The reactor transferred and connected to the vacuum line, vacuumed below 0.3 Torr and cooled below −79° C. and 387 g (4.4 mol) of PF$_3$ introduced in the reactor. Then the reactor warmed to room temperature, stirring started, the reactor further warmed to 120° C. and the content stirred under PF$_3$ pressure for 22 hours. Then reactor content cooled to 35-45° C. and the portion of gases (about 25-35%) directed in pre vacuumed trap (0.44 L, material stainless steel) cooled with the dry ice—isopropanol mixture. The reactor closed, trap kept for about 10 min and then the non-condensable gas directed in the second trap cooled with liquid nitrogen (6 L, material Aluminum). Transfer lines and valves were warmed if cooled below 0° C. with the passing gas. After condensation of PF$_3$ portion in 6 L Al trap, vacuum applied to 6 L Al trap to get the pressure in trap below 1 Torr. Operation repeated until all PF$_3$ and Pt(PF$_3$)$_4$ were stripped from the reactor and collected in two different traps. Then the trap with Pt(PF$_3$)$_4$ was reconnected to a separate pre-vacuumed vessel (50 mL, stainless steel). The parent trap with Pt(PF$_3$)$_4$ warmed to room temperature, while a receiving vessel cooled with liquid nitrogen and all Pt(PF$_3$)$_4$ distilled in the receiving vessel under a static vacuum. After distillation, the receiving vessel warmed to room temperature and the residual PF$_3$ released through the scrubber. Yield of Pt(PF$_3$)$_4$ is 23.2 g, 25.9% from K$_2$PtCl$_6$. See Table 4, which lists the yields of Pt(PF$_3$)$_4$ starting from K$_2$PtCl$_6$, in the two reactions of this Example and the above Comparative Example 1. #13 is from the above Comparative Example 1 #11 and #14 was the result of this Example. Both reactions are at the same temperature and PF$_3$ pressure. Assay of Pt(PF$_3$)$_4$ by integration of $^{19}$F NMR spectrum is 99.48%. $^{19}$F NMR of neat product from experiment b) (a CFCl$_3$, ppm): −11.5 (m, J(P-F)=1302 Hz, 99.48%, Pt(PF$_3$)$_4$), −34.4 (d, J(P-F)=1402 Hz, 0.3%, PF$_3$), −92.4 (d, J(P-F)= 2035 Hz, 0.2%, POF$_3$).

TABLE 4

| # | K$_2$PtCl$_6$ (g) | Hexadecane | Yield of Pt(PF$_3$)$_4$ |
|---|---|---|---|
| 13 | 54.1 | — | 60% (36.2 g) |
| 14 | 79.5 | 120 mL | 26% (23.2 g) |

The reason of the low yields of using PtCl$_2$ in Table 3 may be due to inefficient mixing of components, coating of metal with the metal chloride during the reaction and other factors accompanying the reaction starting from two different solids and gas. The solution may be to shift from a solid gas-system to the solution-solid system to have a better mixing of components and more efficient interaction of components dissolved in the liquid phase with the suspended metal powder. However, no solution-solid system have been reported thus far because of the expectation that solvent will undergo catalytic reaction with Pt precursor or intermediate.

Although the subject matter described herein may be described in the context of illustrative implementations to process one or more computing application features/operations for a computing application having user-interactive components the subject matter is not limited to these particular embodiments. Rather, the techniques described herein may be applied to any suitable type of user-interactive component execution management methods, systems, platforms, and/or apparatus.

It will be understood that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

While embodiments of this invention have been shown and described, modifications thereof may be made by one skilled in the art without departing from the spirit or teaching of this invention. The embodiments described herein are exemplary only and not limiting. Many variations and modifications of the composition and method are possible and within the scope of the invention. Accordingly, the scope of protection is not limited to the embodiments described herein, but is only limited by the claims which follow, the scope of which shall include all equivalents of the subject matter of the claims.

What is claimed is:

1. A method for synthesis of Pt(PF$_3$)$_4$ (CAS #19529-53-4), the method comprising the steps of:
   forming a suspension of a platinum precursor Pt(Hal)$_2$, wherein Hal=F, Cl, Br or I, and a metal powder in a solvent;
   introducing excess amount of PF$_3$ into the suspension of Pt(Hal)$_2$ and the metal powder;
   forming a soluble reaction intermediate Pt(Hal)$_2$(PF$_3$)$_x$ in the solvent through a reaction between PF$_3$ and Pt(Hal)$_2$, wherein Hal=F, Cl, Br or I; x=1, 2, under a reaction condition; and
   forming Pt(PF$_3$)$_4$ from a reaction between Pt(Hal)$_2$(PF$_3$)$_x$, the metal powder and the excess of PF$_3$ in the solvent.

2. The method of claim 1, wherein the reaction condition includes a reaction temperature below approximately 200° C.

3. The method of claim 1, wherein the reaction condition includes a reaction pressure below approximately 300 psig.

4. The method of claim 1, wherein the metal powder is a copper, zinc or aluminum powder.

5. The method of claim 1, wherein the metal powder has a particle size ranging from 200-900 microns.

6. The method of claim 1, further comprising the step of synthesizing the soluble reaction intermediate Pt(Hal)$_2$(PF$_3$)$_x$ (Hal=F, Cl, Br or I; x=1, 2), wherein the synthesizing step comprises the steps of:
   dispersing the platinum precursor Pt(Hal)$_2$ into the solvent forming a suspension of Pt(Hal)$_2$, wherein Hal=F, Cl, Br or I;
   introducing PF$_3$ into the suspension of Pt(Hal)$_2$; and forming the solution of the soluble reaction intermediate $Pt(Hal)_2(PF_3)_x$ (Hal=F, Cl, Br or I; x=1, 2) in the solvent through a reaction of $PF_3$ and $Pt(Hal)_2$.

7. The method of claim 6, wherein the platinum precursor $Pt(Hal)_2$ is anhydrous.

8. The method of claim 6, wherein the soluble reaction intermediate $Pt(Hal)_2(PF_3)_x$ (Hal=F, Cl, Br or I, x=1, 2) is anhydrous.

9. The method of claim 1, wherein the solvent is an anhydrous solvent.

10. The method of claim 1, wherein the solvent has a boiling point higher than 150° C.

11. The method of claim 1, wherein the solvent is a hydrocarbon solvent selected form an oxyhydrocarbon solvent having a general formula $(C_nH_{2n+1})_2O$ (n≥1) and $H_3C(O(CH_2)_2)_nOCH_3$ (n≥1), an arene solvent having a general formula $(C_nH_{2n+1})_xC_6H_{6-x}$ (x≥1, n≥1) or an alkane solvent having a general formula $C_nH_{2n+2}$ (n≥1).

12. The method of claim 1, wherein a yield of $Pt(PF_3)_4$ is in a range of approximately 70-99.9%.

13. The method of claim 1, wherein a purity of $Pt(PF_3)_4$ is approximately 90-99.9 wt. % after purification.

14. A method for synthesis of $Pt(PF_3)_4$ (CAS #19529-53-4), the method comprising the steps of:
   a) forming a suspension of a platinum precursor $Pt(Cl)_2$ in an solvent selected form xylene or hexadecane;
   b) introducing excess amount of $PF_3$ into the suspension of $Pt(Cl)_2$ to form a solution of $Pt(Cl)_2(PF_3)_x$ (x=1, 2) in the solvent through a reaction between $PF_3$ and $Pt(Cl)_2$;
   c) adding a copper powder into the solution of $Pt(Cl)_2(PF_3)_x$ (x=1, 2); and
   d) forming $Pt(PF_3)_4$ from a reaction between the copper powder, $PF_3$ and $Pt(Cl)_2(PF_3)_x$ in the solvent in a $PF_3$ pressure below approximately 300 psig and a reaction temperature below approximately 200° C.

15. The method of claim 14, wherein the copper powder has a particle size ranging from 200-900 microns.

16. The method of claim 14, wherein the solvent is an anhydrous solvent.

17. A method for synthesis of $Pt(PF_3)_4$ (CAS #19529-53-4), the method comprising the steps of:
   a) forming a suspension of a platinum precursor $Pt(Hal)_2$, wherein Hal=F, Cl, Br or I, and a metal powder in a solvent;
   b) introducing excess amount of $PF_3$ into the suspension of $Pt(Hal)_2$ and the metal powder; and
   c) forming $Pt(PF_3)_4$ from a reaction between $Pt(Hal)_2$, the metal powder and the excess $PF_3$ in the solvent under a reaction condition.

18. The method of claim 17, further comprising the step of forming a soluble reaction intermediate $Pt(Hal)_2(PF_3)_x$ in the solvent through a reaction between $PF_3$ and $Pt(Hal)_2$, wherein Hal=F, Cl, Br or I; x=1, 2.

19. The method of claim 18, wherein the soluble reaction intermediate $Pt(Hal)_2(PF_3)_x$ and $Pt(Hal)_2$ are anhydrous.

20. The method of claim 17, further comprising the step of synthesizing the soluble reaction intermediate $Pt(Hal)_2(PF_3)_x$ (Hal=F, Cl, Br or I; x=1, 2), wherein the synthesizing step comprises the steps of:
   dispersing the platinum precursor $Pt(Hal)_2$ into the solvent forming a suspension of $Pt(Hal)_2$;
   introducing $PF_3$ into the suspension of $Pt(Hal)_2$; and
   forming the solution of the soluble reaction intermediate $Pt(Hal)_2(PF_3)_x$ (Hal=F, Cl, Br or I; x=1, 2) in the solvent through a reaction of $PF_3$ and $Pt(Hal)_2$.

21. The method of claim 20, wherein the soluble reaction intermediate $Pt(Hal)_2(PF_3)_x$ and the platinum precursor $Pt(Hal)_2$ are anhydrous.

22. The method of claim 17, wherein the reaction condition includes a reaction temperature below approximately 200° C.

23. The method of claim 17, wherein the reaction condition includes a reaction pressure below approximately 300 psig.

24. The method of claim 17, wherein the metal powder is a copper, zinc or aluminum powder.

25. The method of claim 17, wherein the metal powder has a particle size ranging from 200-900 microns.

26. The method of claim 17, wherein the solvent is an anhydrous solvent.

27. The method of claim 17, wherein the solvent has a boiling point higher than 150° C.

28. The method of claim 17, wherein the solvent is a hydrocarbon solvent selected form an oxyhydrocarbon solvent having a general formula $(C_nH_{2n+1})_2O$ (n≥1) and $H_3C(O(CH_2)_2)_nOCH_3$ (n≥1), an arene solvent having a general formula $(C_nH_{2n+1})_xC_6H_{6-x}$ (x≥1, n≥1) or an alkane solvent having a general formula $C_nH_{2n+2}$ (n≥1).

29. The method of claim 17, wherein a yield of $Pt(PF_3)_4$ is in a range of approximately 70-99.9%.

30. The method of claim 17, wherein a purity of $Pt(PF_3)_4$ is approximately 90-99.9 wt. % after purification.

* * * * *